United States Patent [19]
O'Hollaren et al.

[11] Patent Number: 6,154,438
[45] Date of Patent: Nov. 28, 2000

[54] STORAGE DISK HAVING SURFACE VARIATIONS THAT VARY MINIMALLY IN HEIGHT RELATIVE TO A DATUM

[75] Inventors: William J. O'Hollaren, Fremont; Neil Deeman, Alamo; Gennady G. Gauzner, Livermore, all of Calif.

[73] Assignee: Seagate Technology, Inc., Scotts Valley, Calif.

[21] Appl. No.: 09/100,298

[22] Filed: Jun. 19, 1998

Related U.S. Application Data

[60] Provisional application No. 60/073,892, Feb. 6, 1998.

[51] Int. Cl.[7] ........................................................ G11B 7/24
[52] U.S. Cl. ........................................ 369/275.3; 428/64.4
[58] Field of Search .............................. 369/275.3, 275.2, 369/275.4, 273, 272, 280, 283; 430/320, 321; 428/64.1, 64.4

[56] References Cited

U.S. PATENT DOCUMENTS

| | | | |
|---|---|---|---|
| 4,893,299 | 1/1990 | Humberstone et al. | 369/275.4 |
| 5,427,833 | 6/1995 | Nakayama et al. | 428/64.4 |

*Primary Examiner*—Tan Dinh
*Attorney, Agent, or Firm*—Edward P. Heller, III; Raghunath S. Minisandram

[57] ABSTRACT

A storage media is provided. The surface of the media is made to vary by an insubstantial amount relative to a datum to provide for improved flyability of a head over the surface.

3 Claims, 21 Drawing Sheets

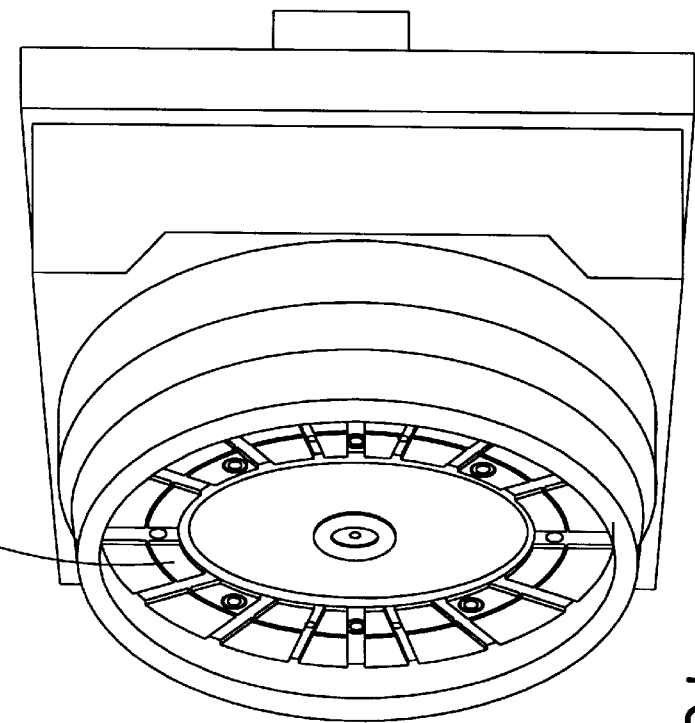
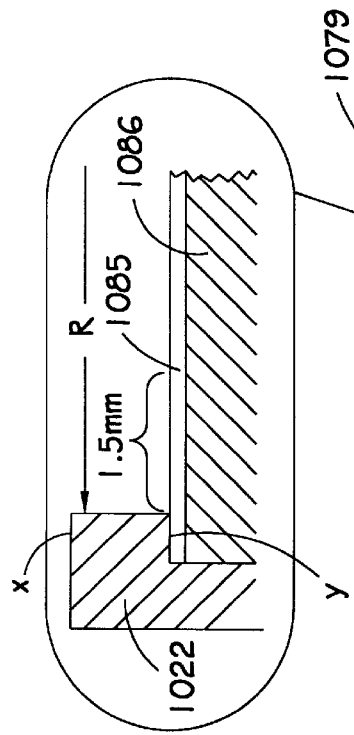
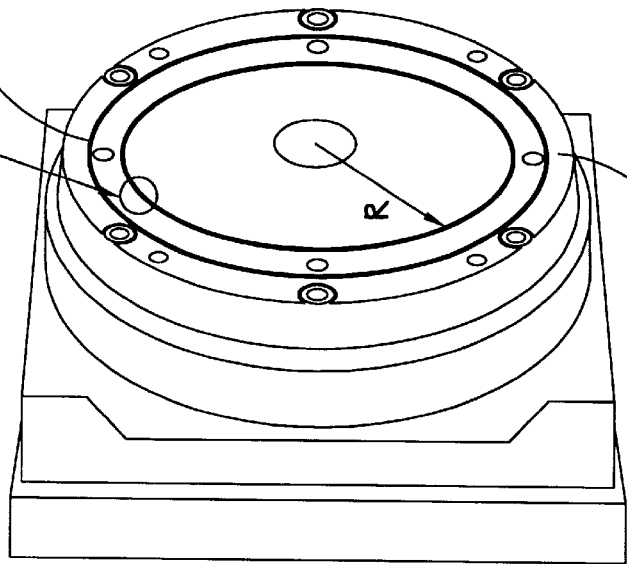
Prior Art
Fig. 10d

Mold Cross-Section

Mold Top View

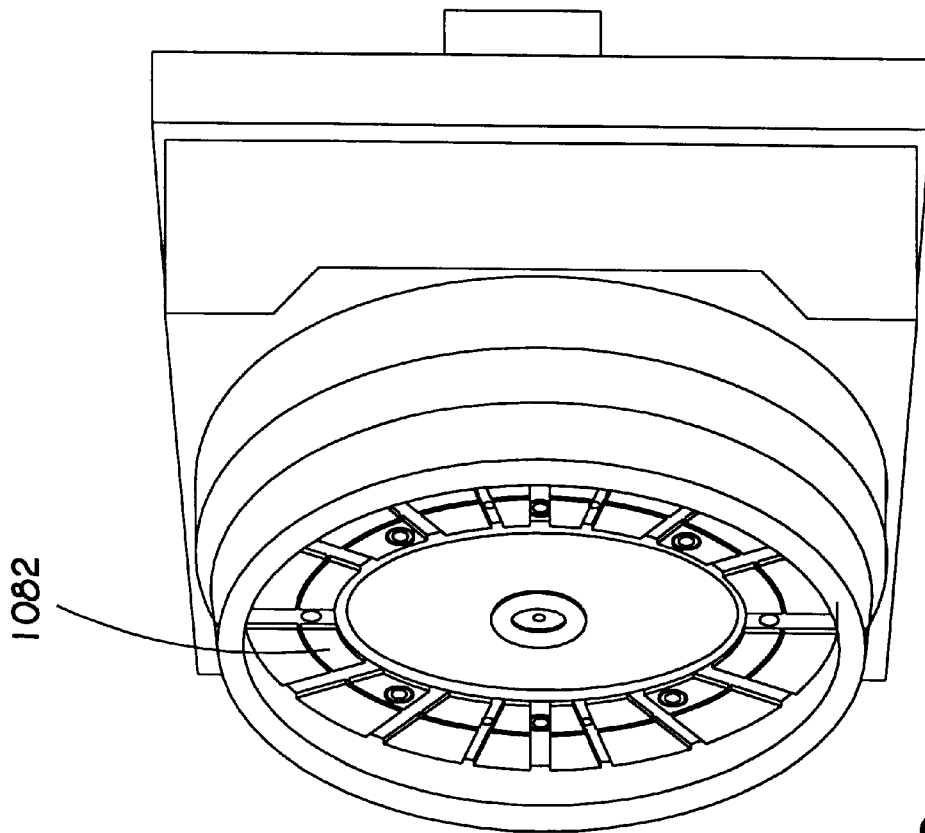
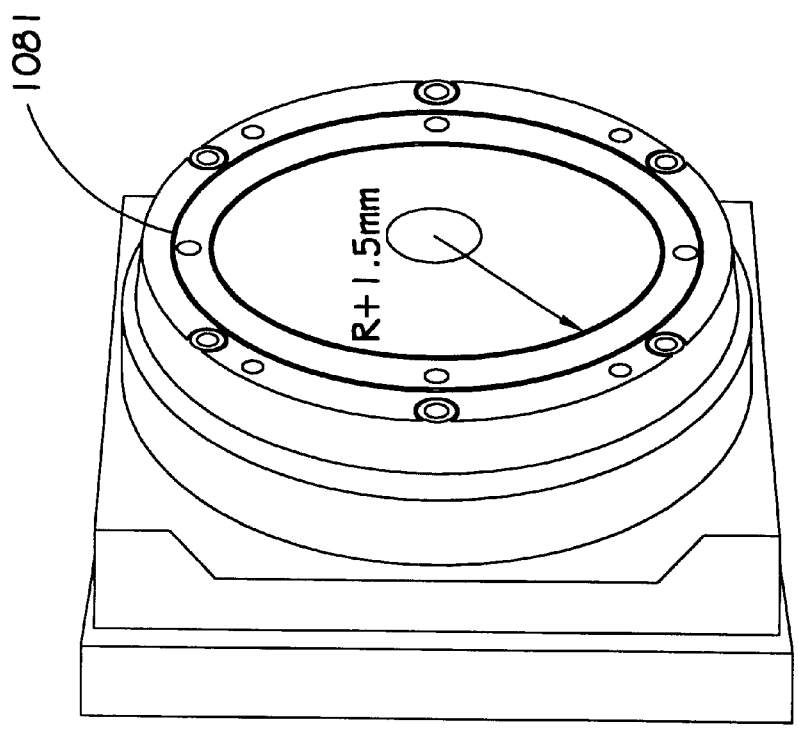
Fig. 10g

Structure of polymers
a) amorphous thermoplastic
b) partially crystalline thermoplastics
c) thermosets
d) elastomers

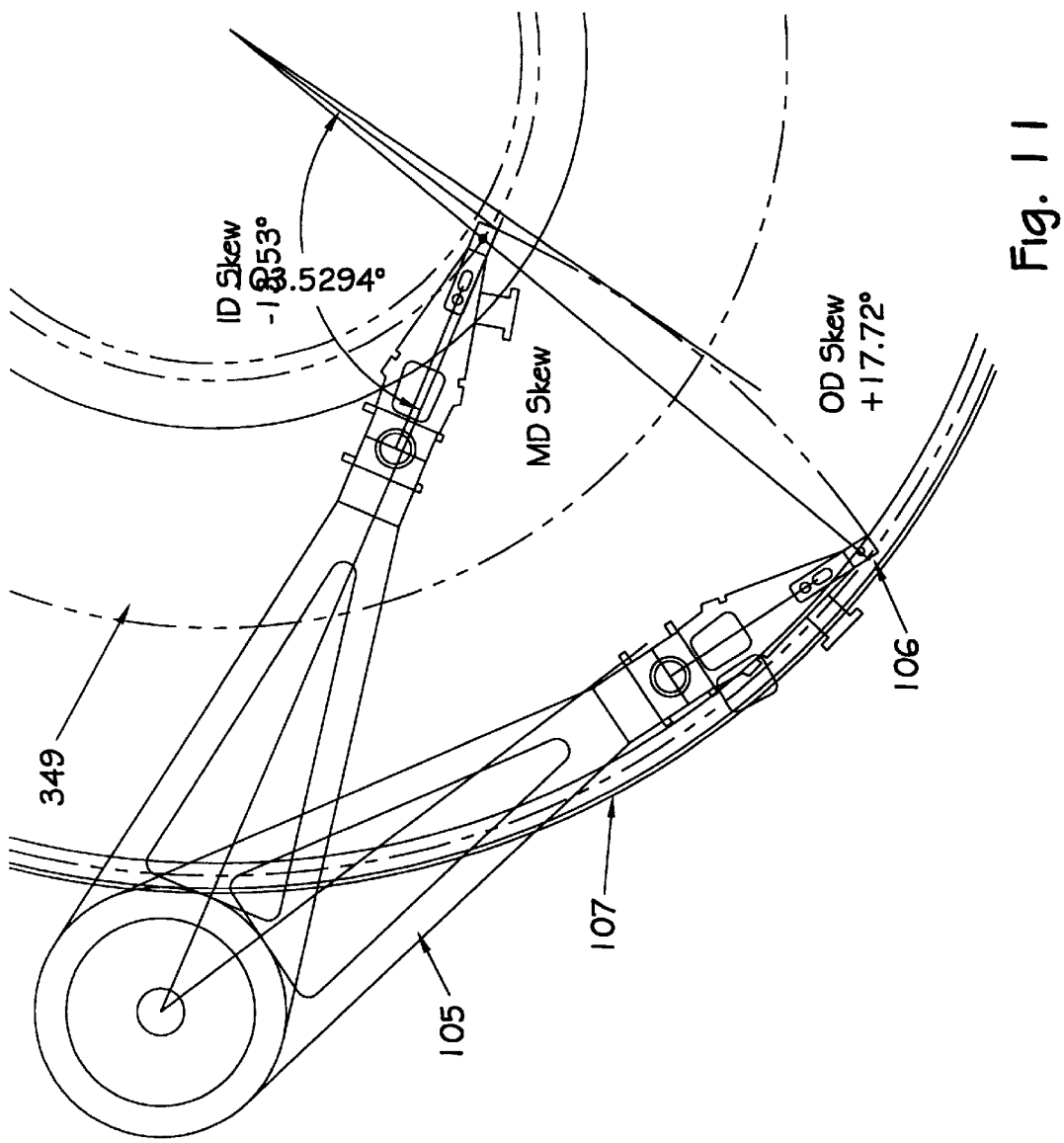

STORAGE DISK HAVING SURFACE VARIATIONS THAT VARY MINIMALLY IN HEIGHT RELATIVE TO A DATUM

RELATED APPLICATIONS

The present invention is related to and claims priority from U.S. Provisional Application No. 60/073,892 entitled "Increased Storage Capacity For Disk Media", filed on Feb. 6, 1998 and is incorporated herein by reference.

BACKGROUND OF THE INVENTION

1. Field of the Invention

The present invention relates generally to data storage using media and more particularly to increased data storage using magneto-optical data media.

2. Background Art

Information storage technology and the storage capacity available therefrom has historically been limited by a number of factors. A typical prior art Winchester magnetic storage system includes a magnetic head that has a slider element and a magnetic read/write element and is coupled to a rotary actuator magnet and coil assembly by a suspension and actuator arm so as to be positioned over a surface of a spinning magnetic disk. In operation, lift forces are generated by aerodynamic interactions between the magnetic head and the spinning magnetic disk. The lift forces are opposed by equal and opposite spring forces applied by the suspension such that a predetermined flying height is maintained over a full radial stroke of the rotary actuator assembly above the surface of the spinning magnetic disk.

Flying head designs have been proposed for use with other storage technologies, including magneto-optical (MO) storage technology. Magneto-optical information access requires the use of polarized laser light for reading and writing information on an MO disk. In the case of reading information, MO technology makes use of a magneto-optical effect ("Kerr" effect) to detect a modulation of polarization rotation imposed on the linearly polarized incident laser beam by the recorded domain marks in the recording layer. The polarization rotation (representing the information stored at recorded marks or in the edges of the recorded marks) is embodied in a reflection of the linearly polarized laser beam and is converted by optics and electronics for readout.

Increased storage capacity with storage drives up to present has been addressed through improvements in the ability to store information on the particular storage disk with an increased areal density, e.g., decreasing the size of the optical spot formed by the laser light in a magneto-optical system. Until recently, these prior art approaches have been adequate for increasing storage capacity and, therefore, other approaches have not been fully explored.

One factor that limits disk drives is the inability to fully utilize an entire disk surface area for information storage. This limitation is partly due to a "ski jump" that is formed during an injection molding process of the prior art disks. Because a surface area of an outer radial region of the prior art disk containing the ski jump is not sufficiently flat, an air bearing suitable for sustaining a flying condition is not maintainable for flying a head over this outer radial region. Also, the bulk properties of the outer radial region in the area near the ski jump may create high stress in the region such that passage of light through the magneto-optical layers for reading and writing of information in the region is adversely affected.

What is needed, therefore, is an apparatus and method that improves upon prior art access to, and storage of, information on storage media.

SUMMARY OF THE INVENTION

The present invention includes an MO disk and process for its making whereby the height of the surface of the disk does not vary appreciably across the entire surface of the disk. In the preferred embodiment, the present invention utilizes the conventional injection molding process, however, the mold is designed to allow for selective heating around the cavity outer diameters (O.D.s) to be increased above that of the rest of the mold. This heating is provided to allow for improved flow into the outer radius areas, which will give a more uniform part density, and therefore reduce differential shrinkage. Shrinkage that is uniform along the part surface will also result in a more uniform part surface flatness and thus remove or reduce a "ski jump" area of the MO disk.

An alternate embodiment allows for this shrinkage by constructing molds with oversized O.D.s which can be later trimmed back to the correct diameters. The oversize would be calculated to place a ski jump surface completely within the area to be removed by the trim tool and process Another alternate embodiment calls for the selection of plastic materials that have improved flow dynamics providing reduced molded part shrinkage for their given molding parameters.

Yet another embodiment would take into account the O.D. shrinkage and factor that into the mold component dimensions such that the molded part, after shrinkage, would be flat.

Still another alternate embodiment makes use of different molding techniques such as reaction injection molding (RIM) or thermal forming through the use of a plastic preform or template placed into a heated mold and then mechanically pressed.

The present invention recognizes that elimination of prior art ski jumps makes available for reading and writing of information data tracks that previously in the prior art were unavailable within the region of the ski jump because of the inability to maintain a stable flying condition of a flying head over prior art MO disks. The aforementioned embodiment for elimination of the ski jump, coupled with a flying MO head described below, makes accessible these previously unavailable data tracks as well as improves optical access to these data tracks.

BRIEF DESCRIPTION OF THE DRAWINGS

FIG. 10d illustrates two halves of a prior art mold;

FIG. 10g illustrates the radius of a mold that is increased by approximately 1.5 mm in an alternative embodiment of the present invention;

FIG. 10i illustrates the structure of various polymers;

FIG. 11 is a diagram of a magneto-optical head used over a surface of a magneto-optical disk;

DETAILED DESCRIPTION OF THE PREFERRED EMBODIMENTS

Figure 1:
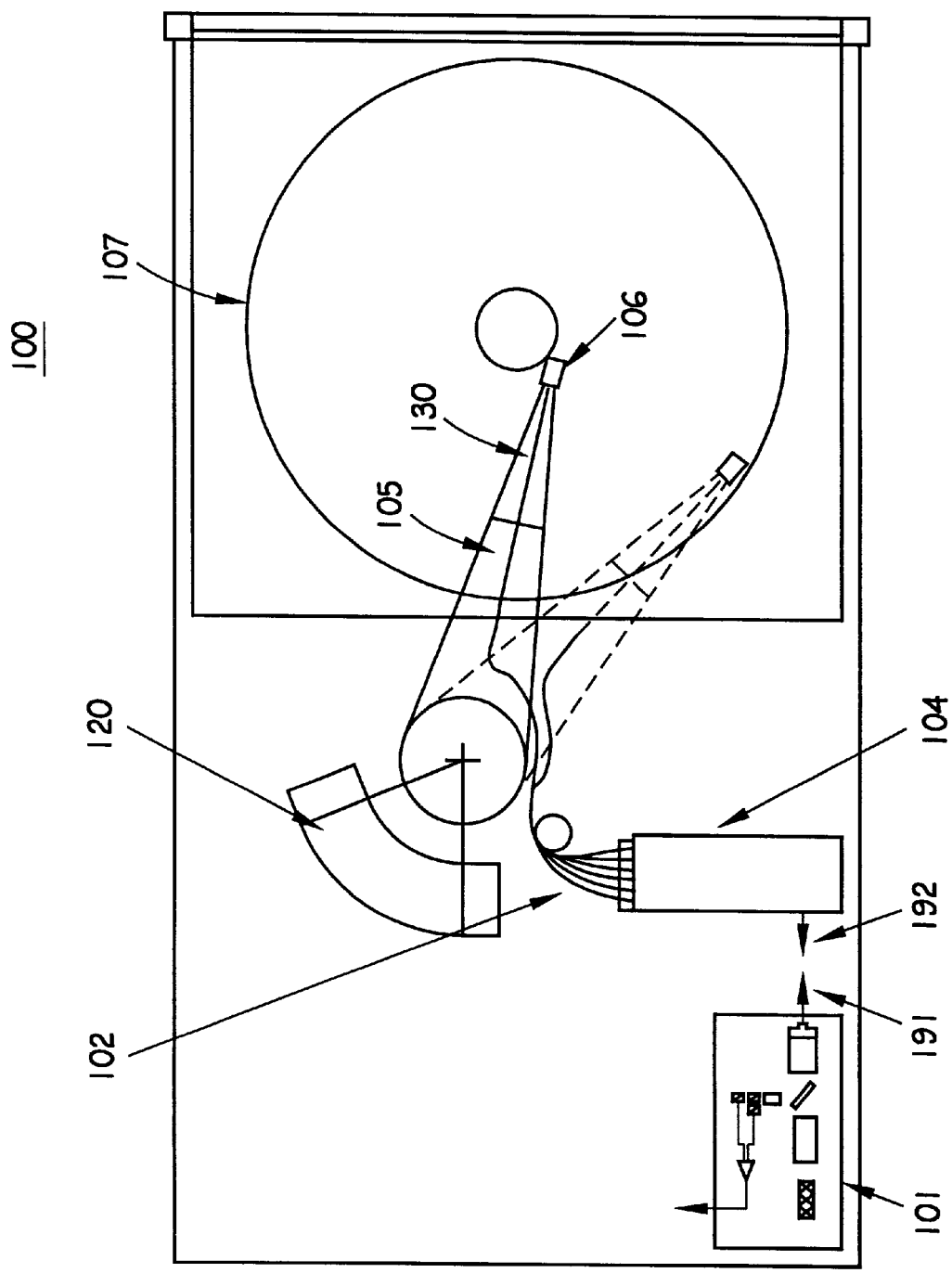
FIG. 1 is a plan view showing a magneto-optical data storage and retrieval system.

Referring in detail now to the drawings wherein similar parts of the invention are identified by like reference numerals, there is seen in FIG. 1 a plan view showing a magneto-optical data storage and retrieval system. In a preferred embodiment, a magneto-optical (MO) data storage and retrieval system 100 includes a set of Winchester-type flying heads 106 that are adapted for use with a set of double-sided MO disks 107 (one flying head for each MO disk surface is illustrated). The set of flying heads 106 (hereinafter referred to as flying MO heads) are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor so as to generate aerodynamic lift forces between the set of flying MO heads 106 and so as to maintain the set of flying MO heads 106 in a flying condition approximately 15 micro-inches above the upper and lower surfaces of the set of MO disks 107. The lift forces are opposed by equal and opposite spring forces applied by the set of suspensions 130. During non-operation, the set of flying MO heads 106 are maintained statically in a storage condition away from the surfaces of the set of MO disks 107.

System 100 further includes: a laser-optics assembly 101, an optical switch 104, and a set of single-mode PM (polarization maintaining) optical fibers 102. In the exemplary embodiment, each of the set of single-mode PM optical fibers 102 are coupled through a respective one of the set of actuator arms 105 and suspensions 130 to a respective one of the set of flying MO heads 106. As will be discussed shortly, the system 100 is used in a configuration that, compared to the prior art, improves access to, and storage of, magneto-optical information on the set of MO disks 107.

Figure 2:
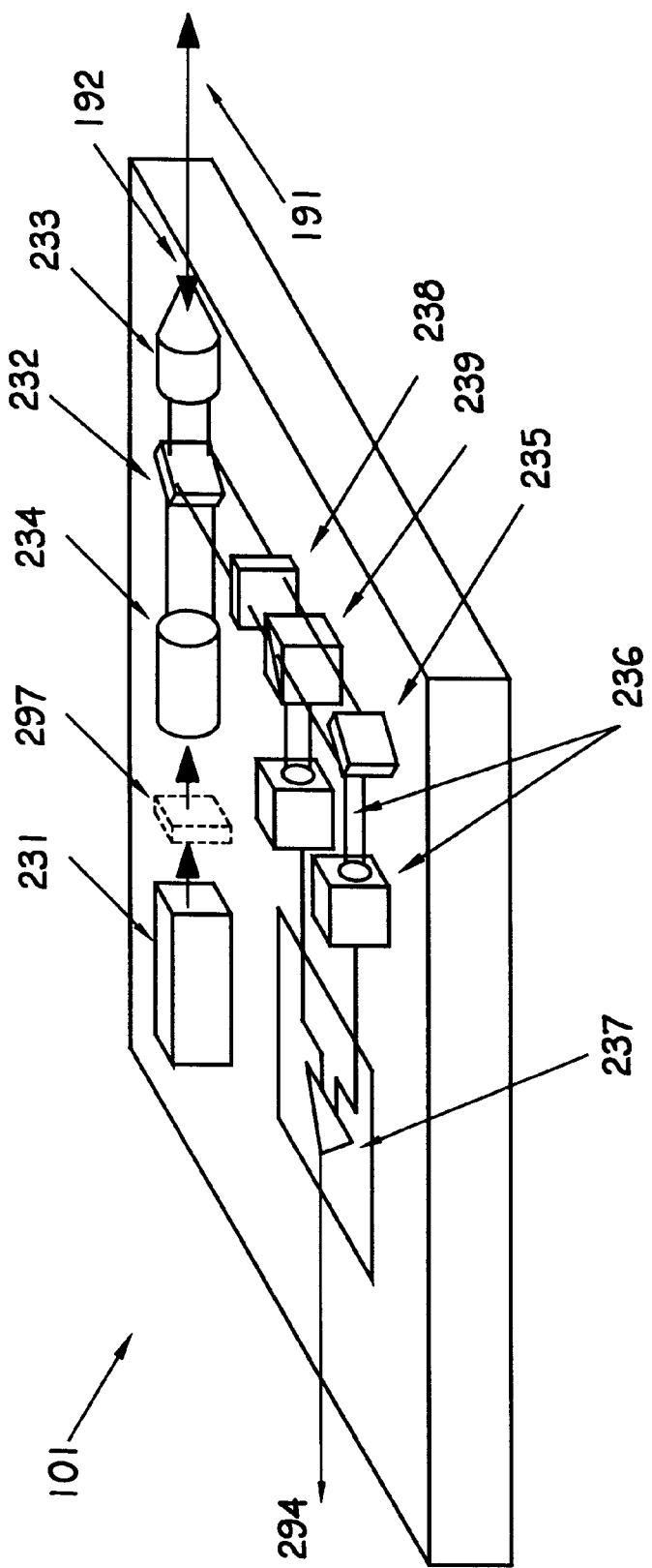
FIG. 2 is a diagram showing the laser-optics assembly of the magneto-optical data storage and retrieval system of FIG. 1.

FIG. 2 is a diagram showing the laser-optics assembly of the magneto-optical data storage and retrieval system of FIG. 1. In FIG. 2, the laser-optics assembly 101 is shown to include a linearly polarized diode laser source 231 operating in a visible or near ultraviolet frequency region and emitting an optical power sufficient for reading and writing using the set of MO disks 107. In a first embodiment, the laser diode source may be a distributed feed-back (DFB) laser source. In a second embodiment, the linearly polarized laser source 231 may be an RF modulated laser source. In an exemplary embodiment, the linearly polarized laser source 231 is selected to operate within a range 635–685 nm; however, a laser source of other frequencies could also be used. The laser-optics assembly 101 further includes: a collimating optics 234, a low wavelength dispersion leaky beam splitter 232, a quarter-wave plate 238, a mirror 235, and a coupling lens 233. The laser-optics assembly 101 directs (with reference to the linearly polarized laser source 231) a linearly polarized outgoing laser beam 191 (shown in FIG. 1) toward the optical switch 104. In the first embodiment, an optical isolator 297 is included between the laser source 231 and the collimating lens 234. A linearly polarized reflected laser beam 192 (shown in FIG. 1) is directed by the optical switch 104 toward the coupling lens 233, and is routed by the leaky beam splitter 232 toward a differential detector comprising: the ¼ wave plate 238, the mirror 235, and the polarizing beam splitter 239. As is well established in the art, this type of differential detection scheme measures the optical power in two orthogonal polarization components of the reflected laser beam 192, with a differential signal being a sensitive measure of polarization rotation induced by the Kerr effect at the surface of one of the set of MO disks 107. In both embodiments, after conversion by a set of photodiodes 236, the differential signal is processed by the differential amplifier 237 for output as signal 294. The present invention is not meant to be limited to the aforementioned arrangement of optical elements and sources of light, as other techniques for directing the outgoing laser beam 191 and for detecting the reflected laser beam 192 are well known in the art.

Figure 3:
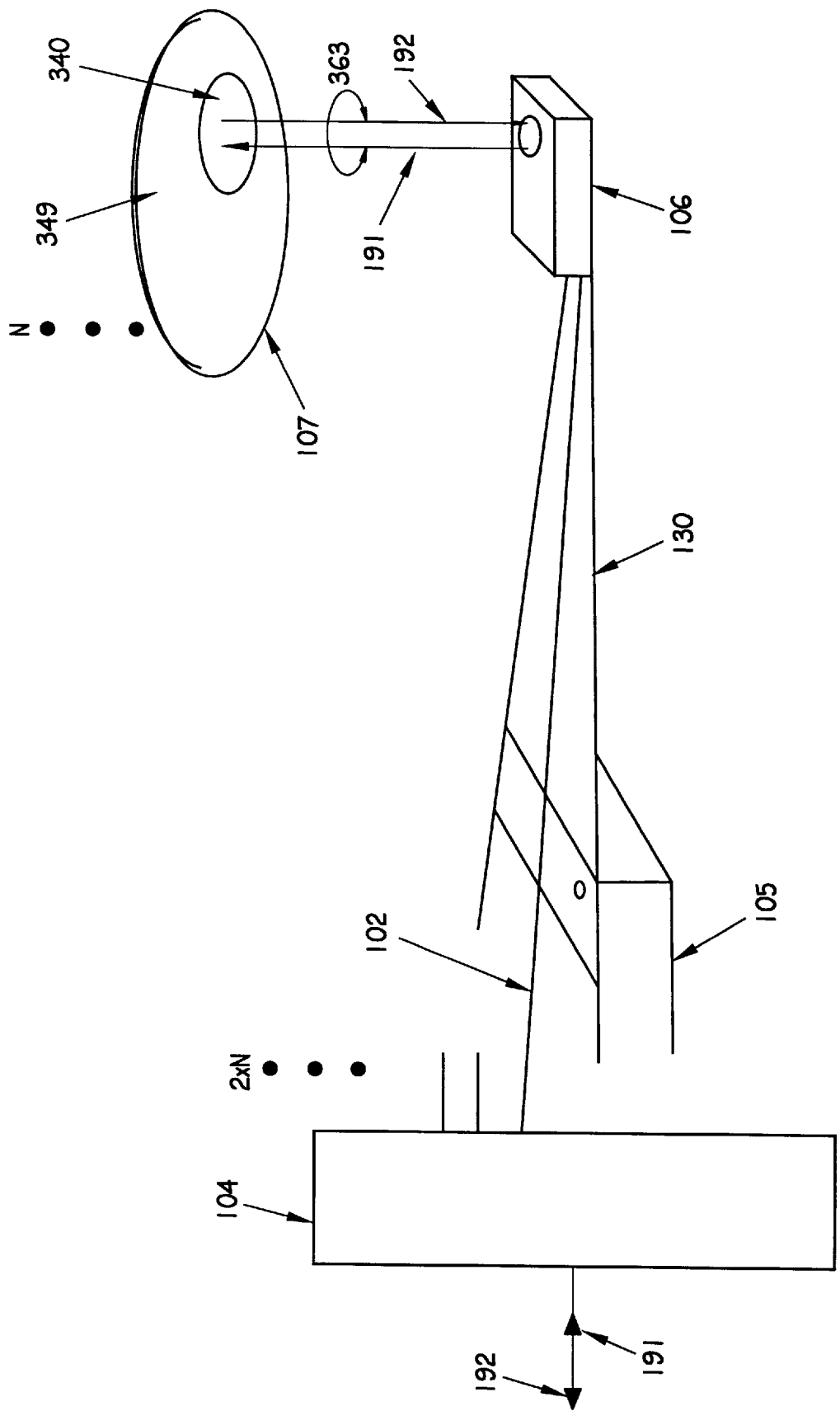
FIG. 3 is a diagram showing a representative optical path.

FIG. 3 is a diagram showing a representative optical path that includes the use of a DFB laser source. In a preferred embodiment, a representative optical path is shown in FIG. 3 to include: the optical switch 104, one of the set of single-mode PM optical fibers 102, and one of the set of flying MO heads 106. The optical switch 104 provides sufficient degrees of selectivity for directing the outgoing laser beam 191 toward a respective proximal end of a respective single-mode PM optical fiber 102. The outgoing laser beam 191 is directed by the single-mode PM optical fiber 102 to exit a respective distal end so as to pass through the flying MO head 106 onto a recording/storage layer 349 of a respective MO disk 107.

In the preferred embodiment the outgoing laser beam 191 is provided by a linearly polarized laser source 231 that is a DFB laser source. A distributed feedback (DFB) diode laser source, unlike an RF-modulated Fabry-Perot diode laser, produces a very narrow band single-frequency output due to the use of a wavelength selective grating element inside the laser cavity. When linearly polarized light from a laser source 231 that is a DFB laser source is launched into a single-mode PM optical fiber 102, the light exiting the optical fiber includes a polarization state that depends on the relative orientation between the fiber axes and the incident polarization, and moreover, the output polarization state is very stable in time as long as external perturbations which alter the fiber birefringence are negligible. This behavior is in contrast to that observed with an RF-modulated Fabry-Perot diode laser source which is characterized by high-frequency fluctuations in its spectral output. With a RF modulated laser source, when linearly polarized light is launched into a single-mode PM optical fiber 102, the laser wavelength fluctuations lead to corresponding polarization fluctuations at the output of the fiber. The resulting polarization noise is minimized when the incident light is launched with its polarization axis aligned with one of the axes of the fiber but, even in this case the polarization noise is larger than the corresponding DFB laser case owing to wavelength dependent mode coupling (mode coupling in PM fibers is a phenomenon whereby a small portion of the light that is being guided along one polarization axis is coupled into the orthogonal axis by intrinsic or stress-induced defects). In MO recording it is preferable that the polarization noise be kept to a minimum, for example, such that a SNR in the range of 20–25 dB can be achieved.

During writing of information, the outgoing laser beam 191 is selectively routed by the optical switch 104 towards the MO disk 107 so as to lower a coercivity of the recording/storage layer 349 by heating a selected spot of interest 340 to approximately the Curie point of the recording/storage layer 349. Preferably, the optical intensity of outgoing laser beam 191 is held constant, while a time varying vertical bias magnetic field is used to define a pattern of "up" or "down" magnetic domains perpendicular to the MO disk 107. This technique is known as magnetic field modulation (MFM). Alternatively, outgoing laser beam 191 may be modulated in synchronization with the time varying vertical bias magnetic field at the spot of interest 340 in order to better control domain wall locations and reduce domain edge jitter. Subsequently, as the selected spot of interest 340 cools, information is encoded within the recording/storage layer 349 of the respective spinning disk 107.

During readout of information, the outgoing laser beam 191 (at a lower intensity compared to writing) is selectively routed to the MO disk 107 such that at any given spot of interest 340, the Kerr effect causes (upon reflection of the outgoing laser beam 191 from the recording/storage layer 349) a reflected laser beam 192 to have a rotated polarization of either clockwise or counter clockwise sense 363 that depends on the magnetic domain polarity at the spot of interest 340.

The aforementioned optical path is bidirectional in nature. Accordingly, the reflected laser beam 192 is received through the flying MO head 106 and enters the distal end of the single-mode PM optical fiber 102. The reflected laser beam 192 propagates along the single-mode PM optical fiber 102 to exit at its proximal end and is selectively routed by the optical switch 104 for transmission towards the laser-optics assembly 101 for subsequent conversion to the signal 294.

Figure 4A:
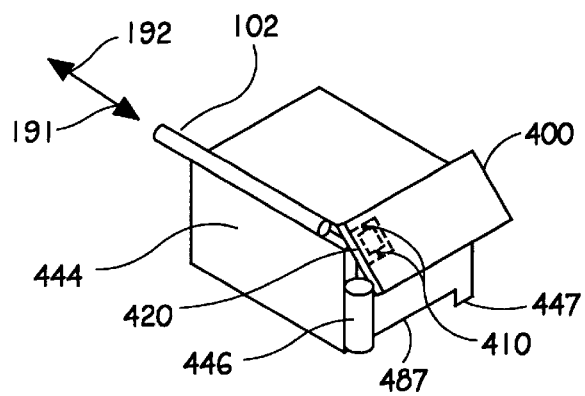
FIGS. 4a–g are diagrams showing the flying magneto-optical head of the magneto-optical data storage in a perspective, a side cross-sectional, an expanded cross-section, a side, a front, a bottom, and a rear view, respectively.

FIGS. 4a–g are diagrams showing the flying magneto-optical head of the magneto-optical data storage in a perspective, a side cross-sectional, an expanded cross-section, a side, a front, a bottom, and a rear view, respectively. In FIG. 4a, the flying MO head 106 is shown for use above a recording/storage layer 349 of one of the set of MO disks 107. The flying MO head 106 includes: a slider body 444, an air bearing surface 447, a quarter-wave plate 493, a reflective substrate 400, objective optics 446, a magnetic coil 460, and a yoke 462. The slider body 444 is dimensioned to accommodate the working distances between the objective optics 446, the single-mode PM optical fiber 102, and the reflective substrate 400. The reflective substrate 400 may include a reflective surface which is aligned so as to direct the outgoing laser beams 191 and 192 to and from the recording/storage layer 349. Although, slider body 444 may include industry standard "mini", "micro", "nano", or "pico" sliders, alternatively dimensioned slider bodies 444 may also be used (as determined by the aforementioned dimensional constraints of the elements used with the flying MO head 106). Accordingly, in the preferred embodiment, the slider body 444 comprises a mini slider height (889 um) and a planar footprint area corresponding to that of a nano slider (1600×2032 um).

The single-mode PM optical fiber 102 is coupled to the slider body 444 along an axial cutout 443, and the objective optics 446 is coupled to the slider body 444 along a vertical corner cutout 411. Although, in the preferred embodiment the axial cutout 443 is located along a periphery of the slider body, and the vertical cutout 411 is located at a corner of the slider body 444, the axial cutout 443 and the vertical cutout 411 may be located at other positions on the flying MO head 106, for example, between the periphery and a central axis or, alternatively, along the central axis itself. Those skilled in the art will recognize that positioning the optical fiber 102 and the objective optics 446 at other than along a central axis may function to affect a center of mass of the magneto-optical head 106 and, thus, its flying dynamics. Accordingly, the point of attachment of the flying MO head 106 to the suspension may require adjustment to compensate for off-center changes in the center of mass of the magneto-optical head 106. Preferably, the cutouts 443 and 411 may be designed as channels, v-grooves, or any other suitable means for coupling and aligning the single-mode optical fiber 102 and objective optics 446 to the flying MO head 106. In the preferred embodiment, the laser beams 191 and 192 traverse an optical path (to and from the recording/storage layer 349 of the MO disk 107) that includes: the single-mode PM optical fiber 102, the reflective substrate 400, the quarter-wave plate 493, and the objective optics 446. In the preferred embodiment, the single-mode PM optical fiber 102 and the objective optics 446 are positioned within their respective cutouts to achieve focus of the outgoing laser beam 191 within the spot of interest 340 (FIG. 3) as a focused optical spot 448. The single-mode PM optical fiber 102 and the objective optics 446 may be subsequently secured in place by using ultraviolet curing epoxy or similar adhesive.

As compared to free space delivery of polarized laser light, the single-mode PM optical fiber 102 provides an accurate means of alignment and delivery of both the outgoing 191 laser beam to the reflective substrate 400 and of the reflected laser beam 192 from the reflective substrate 400 back to the laser-optics assembly 101. The single-mode optical fiber 102 also provides a low mass and low profile optical path. The low mass of the single-mode optical fiber 102 provides a method of delivering light to the flying MO head 106 without substantially interfering with the operating characteristics of the actuator arm 105 and suspension 130. The low profile of the single-mode optical fiber 102 provides the ability to reduce the distance between a set of MO disks without interfering with delivery of light or operation of the flying MO head 106. The single-mode PM optical fiber 102 functions as an aperture of a confocal optical system that has a large depth resolution along its optical axis and an improved transverse resolution. As compared to a non-confocal system, the improved transverse resolution improves the detection of smaller magnetic domain orientations as well as detection of magnetic domain edges. The large depth resolution minimizes cross-talk between closely spaced surface recording levels when using multi-level storage media.

In an exemplary embodiment, the reflective substrate 400 may comprise a steerable micro-machined mirror assembly. A steerable micro-machined mirror assembly is disclosed in commonly assigned U.S. patent application Ser. No. 08/844,207, entitled "Data Storage System Having An Improved Surface Micro-Machined Mirror," filed on Apr. 18, 1997, and which is incorporated herein by reference. In the preferred embodiment, the steerable micro-machined mirror assembly 400 includes a small (in one embodiment, less than 300 um square) reflective central mirror portion 420 (illustrated in FIG. 4a by dashed lines representative of the reflective central mirror portion on a side of the steerable micro-machined mirror assembly 400 opposite to that which is visible). The small size and mass of the steerable micro-machined mirror 400 contributes to the ability to design the flying MO head 106 with a low mass and a low profile. As used in the magneto-optical storage and retrieval system 100, fine tracking and short seeks to a series of nearby tracks may be performed by rotating the reflective central mirror portion 420 about a rotation axis so that the propagation angle of the outgoing laser beam 191 is changed before transmission to the objective optics 446. The reflective central mirror portion 420 is rotated by applying a differential voltage to a set of drive electrodes 404/405 (FIG. 4b). The differential voltage on the electrodes creates an electrostatic force that rotates the reflective central mirror portion 420 about a set of axial hinges 410 and enables the focused optical spot 448 to be moved in the radial direction of the MO disk 107. In the exemplary embodiment, a rotation of approximately +/−2 degrees of the reflective central mirror portion 420 is used for movement of the focused optical spot 448 in an approximately radial direction 450 of the MO disk 107 (equivalent to approximately +/−4 tracks) for storage and retrieval of information, track following, and seeks from one data track to another data track. In other embodiments, other ranges of rotation of the reflective central mirror portion 420 are possible. Coarse tracking may be maintained by adjusting a current to the rotary actuator magnet and coil assembly 120 (FIG. 1). The track following signals used to follow a particular track of the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks. In the prior art, conventional multiple platter Winchester magnetic disk drives use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible. In contrast, irrespective of the movement of the set of actuator arms 105 and set of suspensions 130, a set of the steerable micro-machined mirror assemblies 400 of the present invention may be used to operate independently and thus permit track following and seeks so as to read and/or write information using more than one MO disk surface at any given time. Independent track following and seeks using a set of concurrently operating steerable micro-machined assemblies 400 would preferably require a set of separate respective read channel and fine track electronics and mirror driving electronics. Because the aforementioned embodiment would also preferably require use of separate laser-optics assemblies 101, an optical switch 104 for switching between each of the separate optical paths would not necessarily be required.

Figure 6:
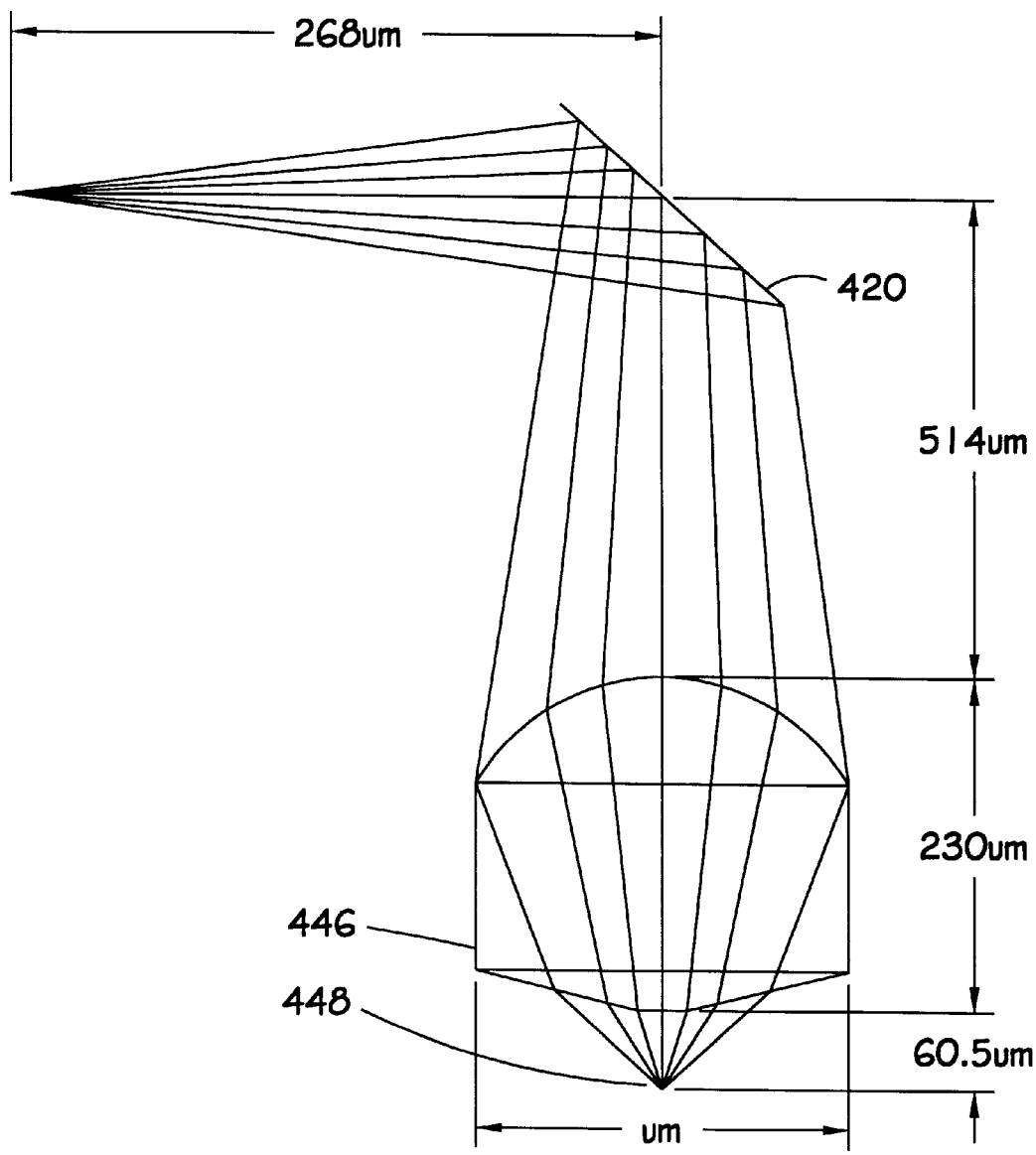
FIG. 6 illustrates an alternative embodiment for the objective optics.

FIG. 6 is a diagram showing an embodiment of the GRIN lens. In the preferred embodiment, the objective optics 446 includes a micro plano-convex GRIN lens (Graded Index) lens of a non-conventional design that provides a high effective NA, low size, and low mass single-element objective optics for use with the flying MO head 106. The non-conventional design of the GRIN lens 446 derives from the radius of curvature that is applied to one plano-surface of a very small diameter conventional plano-plano GRIN rod lens. In the preferred embodiment, this goal is achieved by polishing a conventional plano-plano GRIN rod lens so as to provide a convex surface at planar end of the GRIN rod lens. In the preferred embodiment shown in FIG. 6, the objective optics 446 is a cylindrical plano-convex GRIN lens that includes at a bottom end a plano surface and at an opposite end a convex surface with a radius of curvature of 190 um. As compared to the prior art, the cylindrical and planar portions of the GRIN lens 446 improve the ability to align an optical axis of the objective optics 446 relative to the representative optical path passing through the respective cutout 411 (FIG. 4f) of the flying MO head 106. Use of a single optical element GRIN lens 446 also eliminates a prior art requirement for alignment of multiple objective optic elements relative to each other. In an exemplary embodiment, the GRIN lens 446 diameter is approximately 250 um, and the GRIN lens 446 length is approximately 329 um. An optical path length from a center point of the reflective central mirror portion 420 to the convex surface of the GRIN lens 446 is approximately 435 um. The single-mode PM optical fiber 102 has an NA of approximately 0.15, and the distal end of the single-mode PM optical fiber 102 is positioned approximately 450 um from the center point of the reflective central mirror portion 420. The GRIN lens 446 comprises a gradient index function of sqrt(A)=3.2, which provides an effective NA of approximately 0.67. In an exemplary embodiment, in which the laser-optics source 231 (FIG. 2) operates at a wavelength of 650 nm, over the propagation angle of the outgoing laser beam 191, and as the reflective central mirror portion 420 rotates, the optical spot 448 is preferably maintained with a full width at half-maximum intensity (FWHM) of approximately 0.54 um and with a RMS wavefront error of approximately $\lambda/20$ at a point approximately 25 um below the convex surface of the GRIN lens 446. The GRIN lens objective optics 446, therefore, provides a small size and low mass high NA micro-objective element that is easy to align within the flying MO head 106 during manufacture. One exemplary embodiment of a plano-convex GRIN lens has been described above; however, it will be appreciated that the GRIN lens 446 may comprise other geometries.

The objective lens comprising the GRIN lens 446 has been described as a single element objective lens; however, additional objective optics may also be used to enhance the properties of the GRIN lens 446. For example, the objective optics may include either an aplanatic lens or a solid immersion lens in conjunction with the GRIN lens 446. Use of an additional lens element may achieve a larger numerical aperture and hence a smaller focused optical spot size. A smaller spot size would preferably increase higher areal data densities to be written to and read from the MO disk 107. Micro-optic lenses made by molding glass or plastic may also be used in place of the GRIN lens 446.

As is discussed above, the present invention uses objective optics 446 that are manufactured to very small dimensions. The optical and geometrical properties of the objective optics 446 permit the mounting of a small diameter and low profile magnetic coil 460 and yoke 462 on a bottom surface of the flying MO head 106 or, alternatively, on or near the surface of the objective optics 446, without interfering with the aerodynamic flying qualities of the flying MO head 106.

Figure 7:
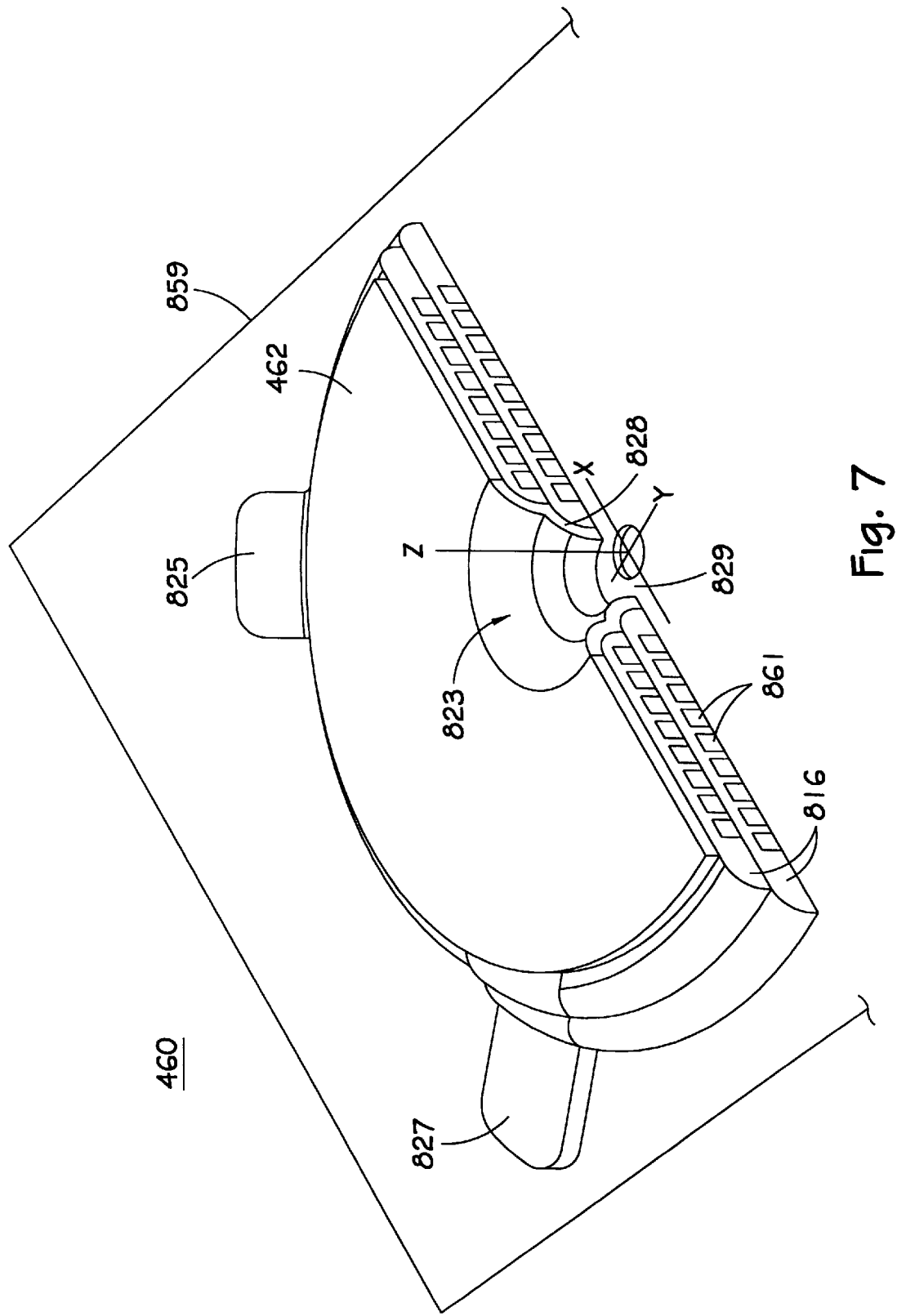
FIG. 7 is a diagram showing a magnetic coil assembly in a representative cutaway view.

FIG. 7 illustrates an alternative embodiment for the objective optics. In an alternative embodiment, the objective optics 446 of FIG. 4 may include a molded glass bi-asphere design that provides a miniature lens system with high numerical aperture and good off-axis performance. As with the use of the plano-convex GRIN lens above, use of a single optical element bi-asphere objective optics 446 also eliminates the prior art requirement for alignment of multiple objective optic elements relative to each other. In an exemplary embodiment, the asphere lens 446 diameter is approximately 250 um, and the asphere lens 446 length is approximately 230 um. An optical path length from a center point of the reflective central mirror portion 420 to the top aspherical surface is approximately 514 um. The single-mode PM optical fiber 102 has an NA of approximately 0.15, and the distal end of the single-mode PM optical fiber 102 is positioned approximately 268 um from the center point of the reflective central mirror portion 420. The top and bottom surfaces of the bi-asphere objective optics 446 are rotationally symmetric to be aspherical as defined by the equation $z=(r^2/R)/(sqrt\ (1-(K-1(r/R)^2))+A_4r^4+A_6r^6$, where for the top surface approximate values for $R=-0.1089$ mm, $K=-0.8484$, $A_4=-13.739$ mm$^{-4}$, and $A_6=490.5349$ mm$^{-6}$, and where for the bottom surface approximate values for $R=0.1069$ mm, $K=-15.9267$, $A_4=-13.8907$ mm$^{-4}$, and $A_6=372.965$ mm$^{-6}$. With a preferable index of refraction of 1.605, the effective NA of the bi-asphere objective optics 446 is approximately 0.68. In an exemplary embodiment in which the laser-optics source 231 (FIG. 2) operates at a wavelength of 635 nm, over the propagation angle of the outgoing laser beam 191 and as the reflective central mirror portion 420 rotates, the optical spot 448 is preferably maintained with a full width at half-maximum intensity (FWHM) of approximately 0.52 um and with a RMS wavefront error of approximately $\lambda/20$ at a point approximately 60.5 um below the convex surface of the bi-asphere objective optics 446.

In another embodiment, the objective optics 446 may comprise a molded plastic lens (not shown). If a molded plastic lens is used, the index of refraction of the plastic lens may vary over a desired operating temperature range. Use of a plastic molded lens may require use of a temperature maintaining means on the flying MO head 106. The means for maintaining a temperature may include a small heater coil surrounding the molded plastic lens. In yet another embodiment, a single molded spherical lens with low numerical aperture (0.2–0.4) may be used in conjunction with an aplanatic or solid immersion lens to yield an optical focusing system with relatively high numerical aperture (greater than 0.6). From a manufacturing perspective, molded lenses are attractive because they can be produced in high volume at low cost. One method disclosed here for mass production involves molding a lens array and subsequently sectioning of the array by diamond saw cutting or laser cutting to obtain individual lenses.

Figure 8:
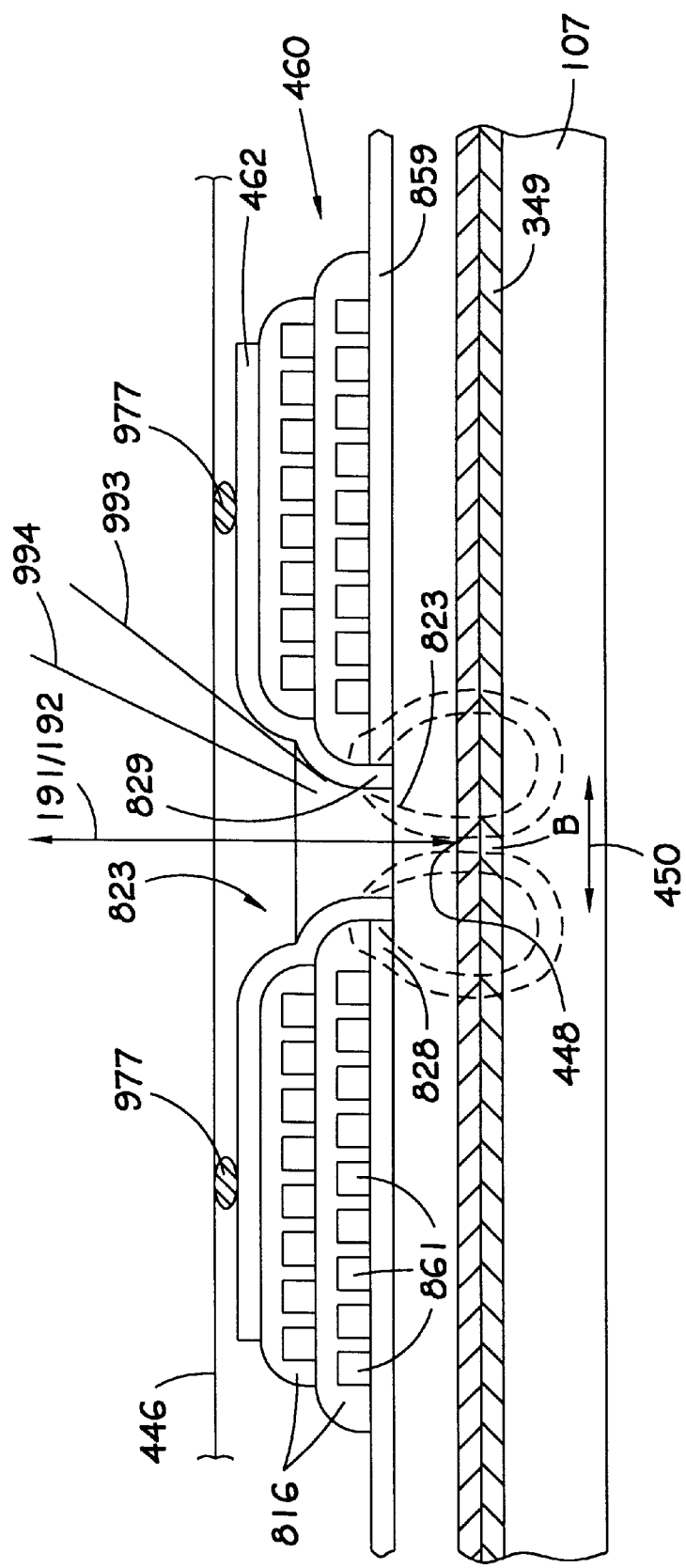
FIG. 8 is a diagram showing a magnetic coil assembly in another representative cutaway view.
Figure 9:
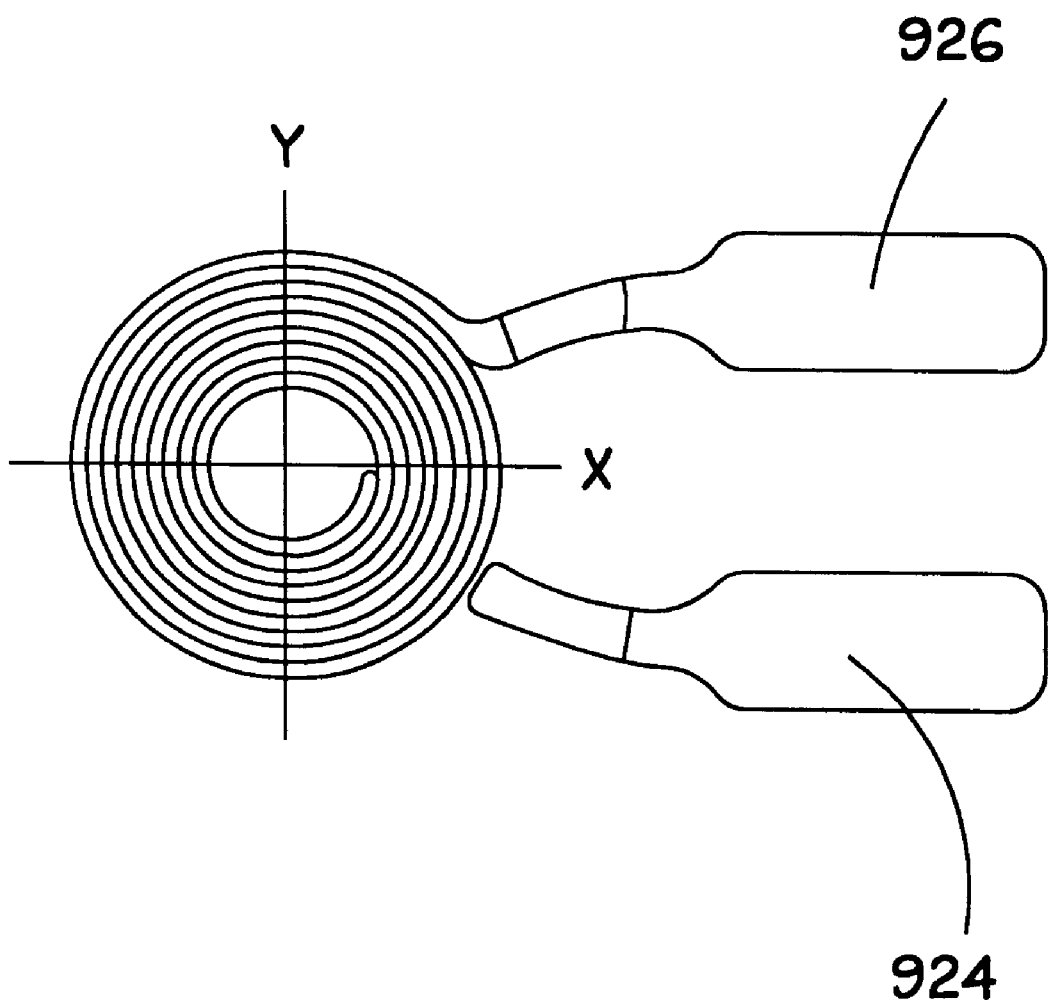
FIG. 9 is a top view of the conductors of the elongated magnetic coil.

FIGS. 8 and 9 are diagrams showing a magnetic coil assembly in two representative cutaway views. In a preferred embodiment, the magnetic coil 460 is a planar microcoil that includes a conductor 861, which is coiled and housed at least partly within a yoke (or permeable flux guide) 462, and encapsulated within an insulation layer 816. In a preferred embodiment, the insulation layer 816 includes a suitable dielectric material, such as a photo-resist material. Although, in the preferred embodiment, the magnetic coil 460 and yoke 462 may be formed on a suitable dielectric protective layer 859, it is understood that use of the magnetic coil assembly of the present invention without a protective layer 859 is also possible. The protective layer 859 preferably includes an aperture formed sufficiently wide for ensuring passage of the outgoing 191 and reflected 192 laser beams (FIG. 1) through a central passage 823 defined by a sloped portion of the yoke 462. In one embodiment the sloped portion of the yoke 462 extends (through a plane defined by at least one layer of the conductor 861) towards the central passage 823, terminating at a tip portion 829 and in a plane of a lower surface of the protective layer 859. In another embodiment, the magnetic coil 460 and yoke 462 may be partly encapsulated within an overcoat (not shown) for added protection and insulation.

In the preferred embodiment the yoke 462 enhances a magnetic field created by the magnetic coil 460 at the recording/storage 349 layer of the MO disk 107. The sloped portion of the yoke 462 preferably further optimizes enhancement of the magnetic field. In an exemplary embodiment, the yoke 462 is made of a ferromagnetic material having a permeability of approximately 2000, for example, a nickel iron alloy (NiFe), and the yoke ranges in thickness from approximately 4 um to approximately 6 um. The yoke tip 828 is dimensioned to terminate at a position such that a maximal magnetic field is generated by the magnetic coil 460 at or near a point (B) within the recording/storage layer 349 of the MO disk 107 (FIG. 9 illustrates the magnetic field lines with dashed lines).

Figure 4C:
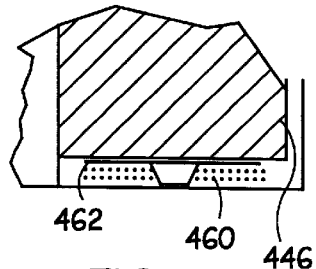
Figure 4B:
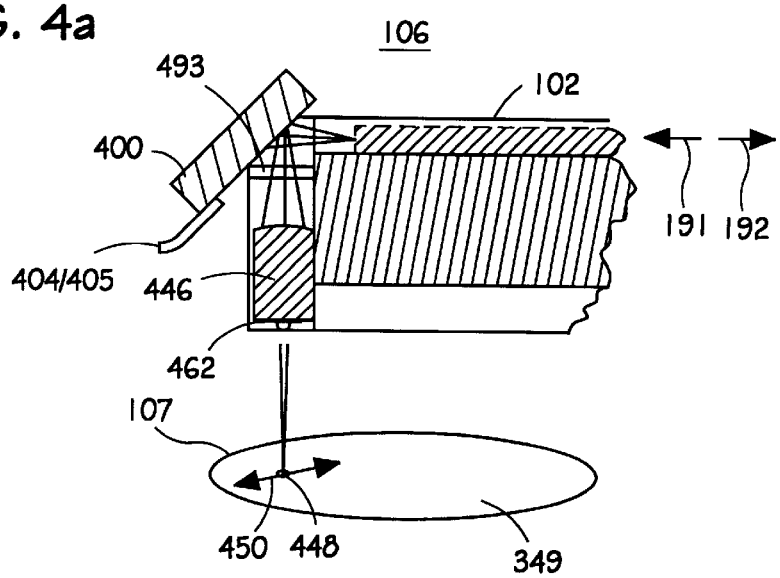
Figure 4D:
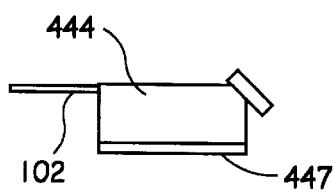
Figure 4G:
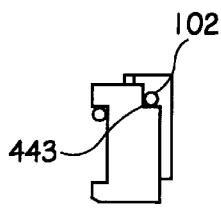
Figure 4F:
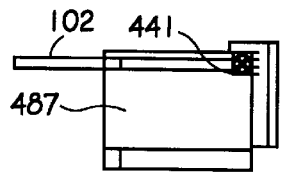
Figure 4E:
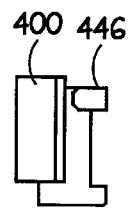
Figure 5:
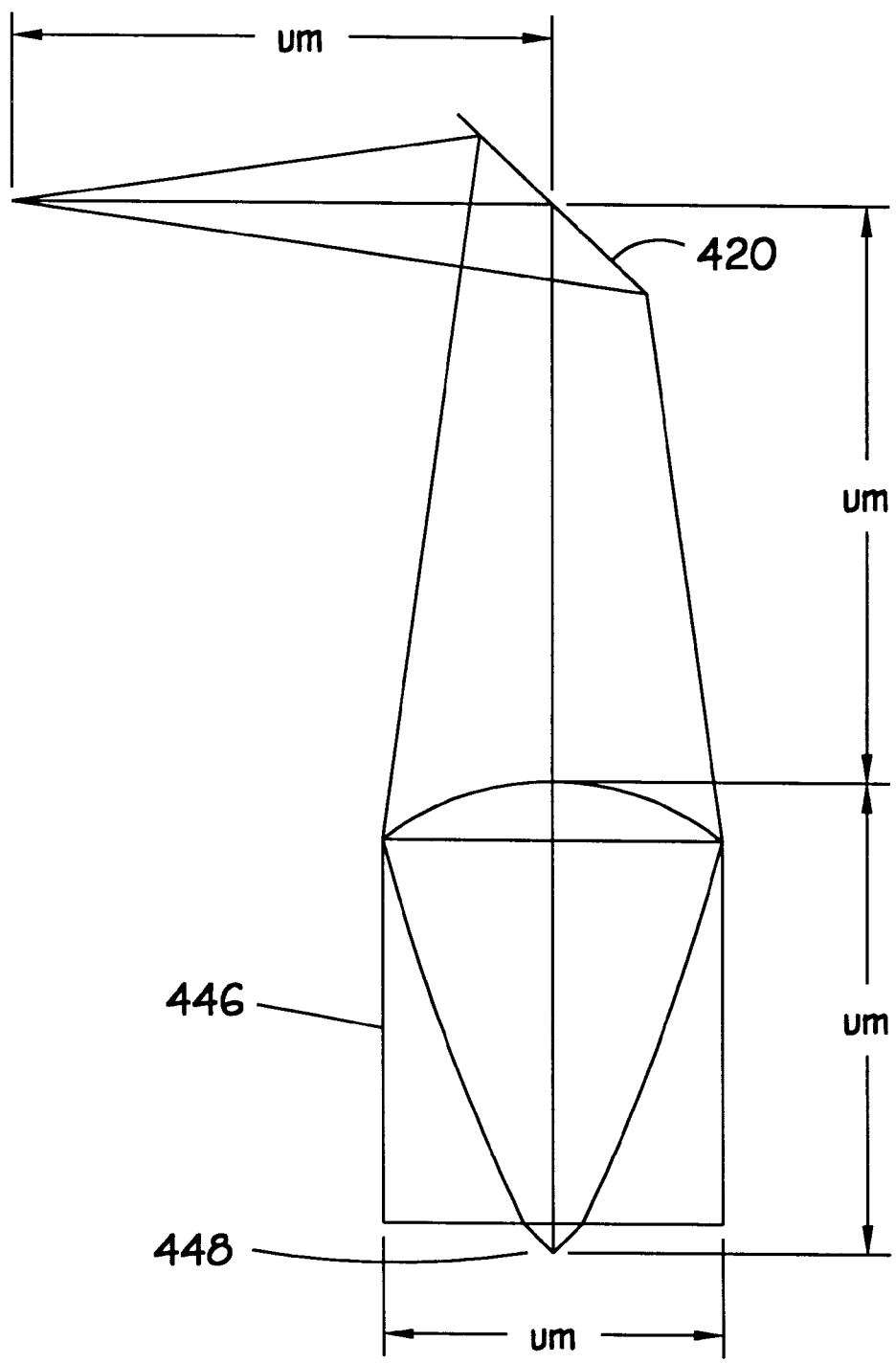
FIG. 5 is a diagram showing an embodiment of the GRIN lens.

As shown in FIG. 4c, the magnetic coil 460 and the yoke 462 are mounted horizontally near the air-bearing surface 447 at, or in proximity to, the lower surface of the objective optics 446 and are centered with respect to an optical axis of the objective optics 446. The conductor 861 may comprise a suitable conductor, such as copper, that is coiled to comprise between 15 to 40 turns or, in one embodiment, 21 turns. In one embodiment, the magnetic coil 460 includes two layers spaced apart in a vertical direction by approximately 6 um. It is understood, however, that in other embodiments, fewer or greater numbers of layers, vertical spacings other than 6 um, as well as fewer or greater numbers of turns are possible. In an exemplary embodiment, a cross-sectional area of the conductor 861 may vary between approximately 2 um and 7 um. In a more specific embodiment, a cross-sectional geometry of the conductor 861 includes a height of approximately 3 um and a width of approximately 2 um. It should be understood that other cross-sectional geometries for the conductor 861 are possible, for example, circular or square cross-sections.

In the preferred embodiment, the magnetic coil 460, the coiled conductor 861, and yoke 462 include a generally elongated geometry. More specifically the magnetic coil 460 (hereinafter referred to as an elongated magnetic coil), the coiled conductor 861 and yoke 462 include an elliptical geometry. In an exemplary embodiment, the outermost dimension of the conductors 861 along the major axis of the elongated magnetic coil 460 is less than approximately 150 microns and along the minor axis less than approximately 120 microns, and the innermost dimension of the conductor 861 along the major axis of the elongated magnetic coil 460 is less than approximately 50 microns and along the minor axis less than approximately 40 microns. In the exemplary embodiment, an innermost dimension of the yoke 462 along the major axis of the elongated magnetic coil 460 is less than approximately 25 microns and along the minor axis less than approximately 20 microns.

Compared to a circular magnetic coil that includes inner and outer dimensions that are equivalent to the inner and outer dimensions of the elongated magnetic coil 460 along the major axis, the elongated magnetic coil 460 provides an advantage in z-axis magnetic field generation efficiency and self-inductance that is better optimized with respect to the required function of moving the optical spot 448 in the disk radial direction 450 by means of the range of motion of the reflective central mirror portion 420 during fine tracking and short seeks to adjacent tracks of a MO disk 107. The elongated magnetic coil 460 geometry provides a denser magnetic field at the surface of the MO disk 107 than would be possible with the aforementioned circular coil. In the preferred embodiment, use of the elongated magnetic coil 460 in combination with the yoke 462 further enhances the magnetic field, preferably, by a factor of approximately two. The low profile and low mass of the elongated magnetic coil 460 and associated yoke 462 minimize interference with the aerodynamic flying qualities of the flying MO head 106 such that the flying MO head 106 and, therefore, the elongated magnetic coil 460 and associated yoke 462 may be positioned in a flying condition above the MO disk 107. The small diameter of the elongated magnetic coil 460 and yoke 462 provides further benefit, in that, smaller data marks than the prior art may be recorded.

An exemplary cross-section of the elongated magnetic coil 460 along constraining linear boundaries at extent of the inner diameter of the conductors 861 and the permeable yoke 462 is illustrated in the cross-section shown in FIG. 9. In an exemplary embodiment, the sloped portion of the yoke 462 at an inner diameter is shown in a major axis direction (x-axis) 993 of the elongated magnetic coil 460. The geometry of the sloped portion is a function of the optical path design as defined by the passage of the outgoing laser beam 191 through the central passage 823 during rotation of the reflective central mirror portion 420 (FIG. 4). A different geometry 994 applies in the y-z planes. In the preferred embodiment, even though the outermost diameter of the objective optics 446 is larger than the outermost diameter of the elongated magnetic coil 460, the elongated magnetic coil 460 and yoke 462 do not interfere with the optical passage of light to and from the MO disk 107. In an embodiment (not shown) of the elongated magnetic coil 460 with an outer major axis dimension larger than the dimension of the objective optics 446 (as compared to a circular coil that has an equivalent outer dimension) the outer dimension of the elongated magnetic coil 460 along the minor axis would be useful in terms of permitting placement of the offset objective optics 446 as close to a periphery of the flying MO head 106 and, therefore, to increase the number of outer data tracks of a MO disk 107 that may be accessed.

Although the elongated magnetic coil 460 and yoke 462 have been described to include an elliptical geometry, this geometry may be generalized to other situations in which alterations to the geometry of the elongated magnetic coil 460 and yoke 462 are made to accommodate a range of motion of an optical beam within the central passage 823, while also maintaining minimum spacing between the turns of the conductor 861 with the associated yoke 462 and the application point of a maximum magnetic field B. Accordingly, other elongated magnetic coil 460, yoke 462, and conductor 862 geometries are within the scope of the invention; for example, oval, rectangular, etc. In another embodiment, in which the reflective central mirror portion 420 (discussed above) is fixed, a circular elongated magnetic coil 460 and yoke 462 geometry would be beneficial in forming a magnetic field at point B. In the aforementioned embodiment, a vertical geometry rather than the sloped yoke portion 462 would be useful in generating an optimal magnetic field. In the preferred embodiment, an upper surface of the yoke 462 (and therefore the elongated magnetic coil 460) is secured to the objective optics 446 (FIG. 4c) by well known techniques, such as adhesive 977. In another embodiment, the elongated magnetic coil 460 and the yoke 462 may be adhesively secured to the bottom surface 487 (FIG. 4a) of the slider body 444 by a plurality of pads, 825 and 827 (Only two pads are illustrated).

FIG. 9 is a top view of the conductors of the elongated magnetic coil. In the preferred embodiment, the conductor 861 includes two pads 924, 926 for connection to an electrical circuit. The pads 924, 926 are preferably made of gold traces. In an exemplary embodiment, with an applied current of less than 50 mA and with an input voltage of less than 8 volts the elongated magnetic coil 460 preferably will not exhibit destructive heating effects. In the preferred embodiment, the magnetic coil 460 exhibits a self inductance of less than approximately 100 nH and a capacitance of less than approximately 6 pf. The magnetic field preferably exhibits a component in a plane perpendicular to the plane of the MO disk 107 (+/−15 degrees). In an exemplary embodiment, a separation distance between the tip 828 of the yoke 462 and the surface of the MO disk 107 is approximately 1 um such that a magnetic field of approximately 290 Gauss at point B is generated generally within the boundaries of the optical spot 448 formed by the outgoing laser beam 191. This compares favorably to the prior art, which because of their bulky size have required that they be positioned at a distance farther away from the magnetic recording media (e.g., at other than the bottom surface of a head). Consequently, the prior art magnetic coil to recording media distance imposes increased current requirements for generation of equivalent magnetic field densities at a media surface. In contrast, the present invention requires less current to generate an equivalent prior art magnetic field density at the media surface. In addition, due to limitations of self inductance, the increased size and current requirements of the prior art magnetic coils is limited by the rate at which their magnetic field may be switched. The reduction in size and current provided by the magnetic coil 460 and yoke 462, therefore, increases the rate at which information may be recorded. The bulky prior art coil designs also contribute to head size so as to impose limits on the number of heads that may be used within any given vertical spacing. For any given field strength, use of the yoke 462 in combination with the elongated coil 460 permits a smaller and less bulky flying magnetic head 106 geometry to be used.

Figure 10A:
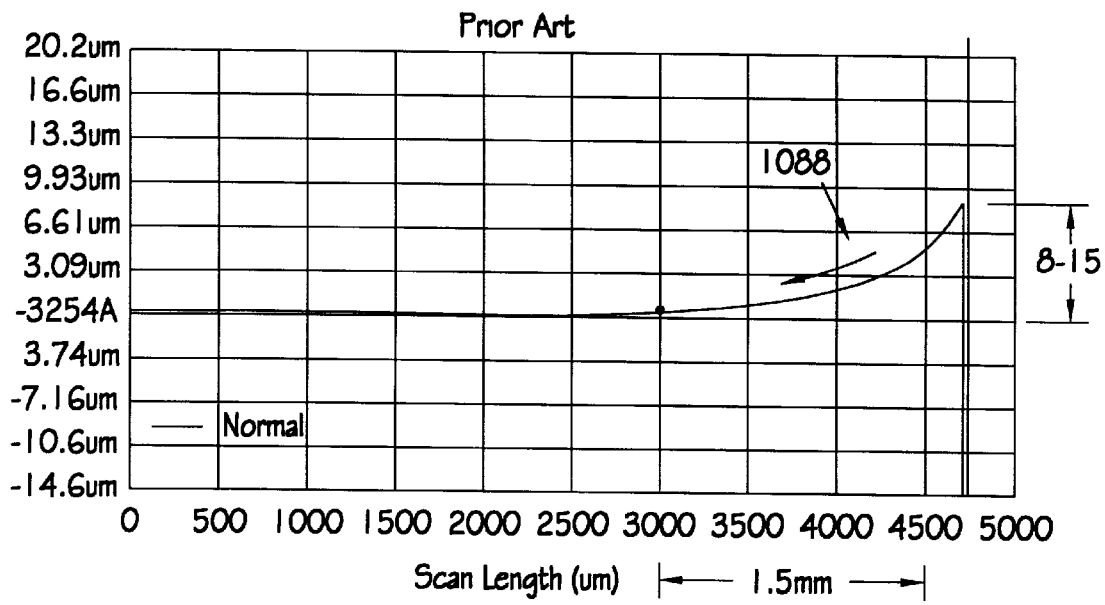
FIGS. 10a–b illustrate ski jumps.

Referring now to FIG. 10a, variations in a top surface of a prior art MO disk are illustrated. The horizontal axis in FIG. 10a corresponds to a 5000 um distance, spanning a radius of one prior art MO disk from an inner region to an outer circumference of the disk. In FIG. 10a there is also seen, along the vertical axis, the surface height of the prior art MO disk from the inner to the outer region, the surface height measured relative to a reference datum plane that is coplanar with the inner surface portion of the MO disk. In an exemplary embodiment of the prior art, as one views the surface of the disk from a center to a circumference, an appreciable increase in height in the surface appears at a point approximately 1.5–2.0 mm from the outer edge of the prior art MO disk and continues to increase until an outer circumference of the disk is reached, whereat a maximum increase in the height is approximately 8–15 microns. The gradually increasing height of the surface area of the outer radial region of the prior art MO disk defines a "ski jump" 1088. Ski jump is a term used to describe an increase in surface height at an outer diameter of a storage disk that occurs during a conventional injection molding process of prior art disk manufacture. Prior art disks, including but not limited to magnetic disk, magneto-optical disks, conventional compact disks, mini disks, and other injection molded disks, have typically not been utilized over their entire surface area for storage purposes. In part, this limitation is due to the formation of the ski jump 1088. Because other well known methods have been readily available for increasing the storage capacity of disk drives, the elimination of the ski jump 1088 has not been treated with much concern in the prior art. The present invention identifies that for any given use of the prior art methods for increasing storage capacity, elimination of the ski jump 1088 will be a preferred component for achieving a maximal increase in storage capacity. It has been identified that at some non-nominal height along the ski jump 1088 the air bearing formed between a flying head floating over the corresponding point on the surface of the prior art MO disk becomes degraded sufficiently such that the flying condition of the head may not be sufficiently maintained, thereby resulting in a head "crash." Thus, unless the ski jump is eliminated or reduced to some minimal value where a flying condition of the head can be maintained, an appreciable portion of the prior art MO disk is made unusable for data storage and retrieval. Also, the bulk properties of the outer radial region in the area near the ski jump 1088 may create high stress in the region such that passage of light through the magneto-optical layers for reading and writing of information in the region is adversely affected. Reduction or elimination of the ski jump would accordingly improve the optical properties of prior art MO disks.

Figure 10B:
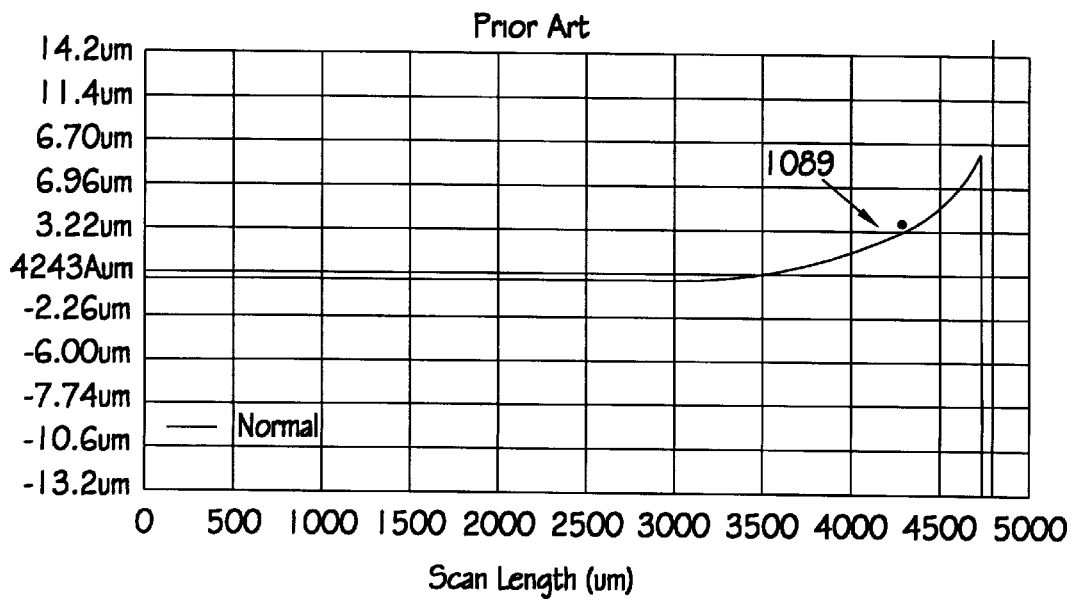

Referring now to FIG. 10*b*, variations in a bottom surface of a prior art MO disk are illustrated. FIG. 10*b* illustrates that in a double sided prior art MO disk a ski jump 1089 is also formed on an outer region of the opposing surface of the MO disk. It is understood that although FIGS. 10*a* and 10*b* illustrate the general shape and dimensions of a particular ski jump, other geometries for the increase in surface height of the prior art MO disk at its outer radial region are also possible.

Figure 10C:
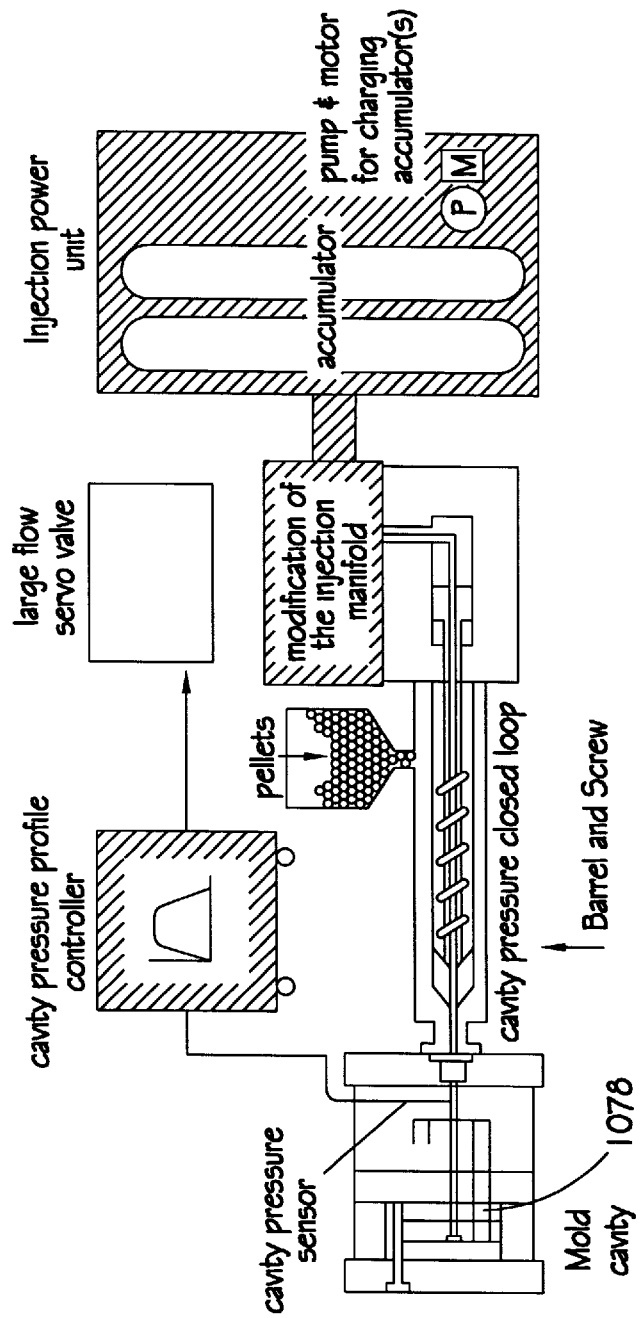
FIG. 10c illustrates an apparatus and method for conventional injection molding of a prior art disk.

Referring now to FIG. 10*c*, an apparatus and method for conventional injection molding of a prior art disk is illustrated. In the prior art, the ski jump regions illustrated in FIGS. 10*a–b* have been identified to form during a cooling stage of the conventional injection molding process. During the process, small pellets of plastic are heated to a homogenous liquid in a barrel and screw. The hot liquid plastic is injected at high pressure into a mold 1078 comprising a cavity that approximates closely the dimensions of the prior art MO disks. In one embodiment, the liquid plastic enters the mold 1078 from its center and fills outwards. During a plastic cooling process, an inner radial region of the prior MO art disk within the cavity of the mold 1078 shrinks slightly more than a remaining outer region, resulting in shrinkage differential and a height change (ski jump) in the outer radial region of the prior art MO disk surface.

Referring now to FIG. 10*d*, the prior art mold 1078 of FIG. 10*c* is illustrated in further detail. The prior art mold 1078 of is of a variety well known in the art and comprises a first half 1079 (seen in cross-section in the exploded view at an outer radius) and a second half 1080, each half including a circular recess surface portion 1086 comprising radius "R". FIG. 10*d* shows the two halves in unclamped disposition, e.g., during removal of the molded prior art MO disk. Each surface portion 1086 preferably has thereon disposed a circular stamper 1085, which is discussed in further detail below. Each stamper 1085 is held in place by an outer ring portion 1022. In the exploded view only one stamper 1085 is shown held by the ring portion 1022, but in a clamped position the opposing stamper is held in place generally at the location indicated by X. During the injection molding process, the first half 1079 and the second half 1080 are clamped shut such that surfaces of the stampers 1085 and the outer ring portion 1022 define the approximate dimensions of the prior art molded MO disk.

Figure 10E:
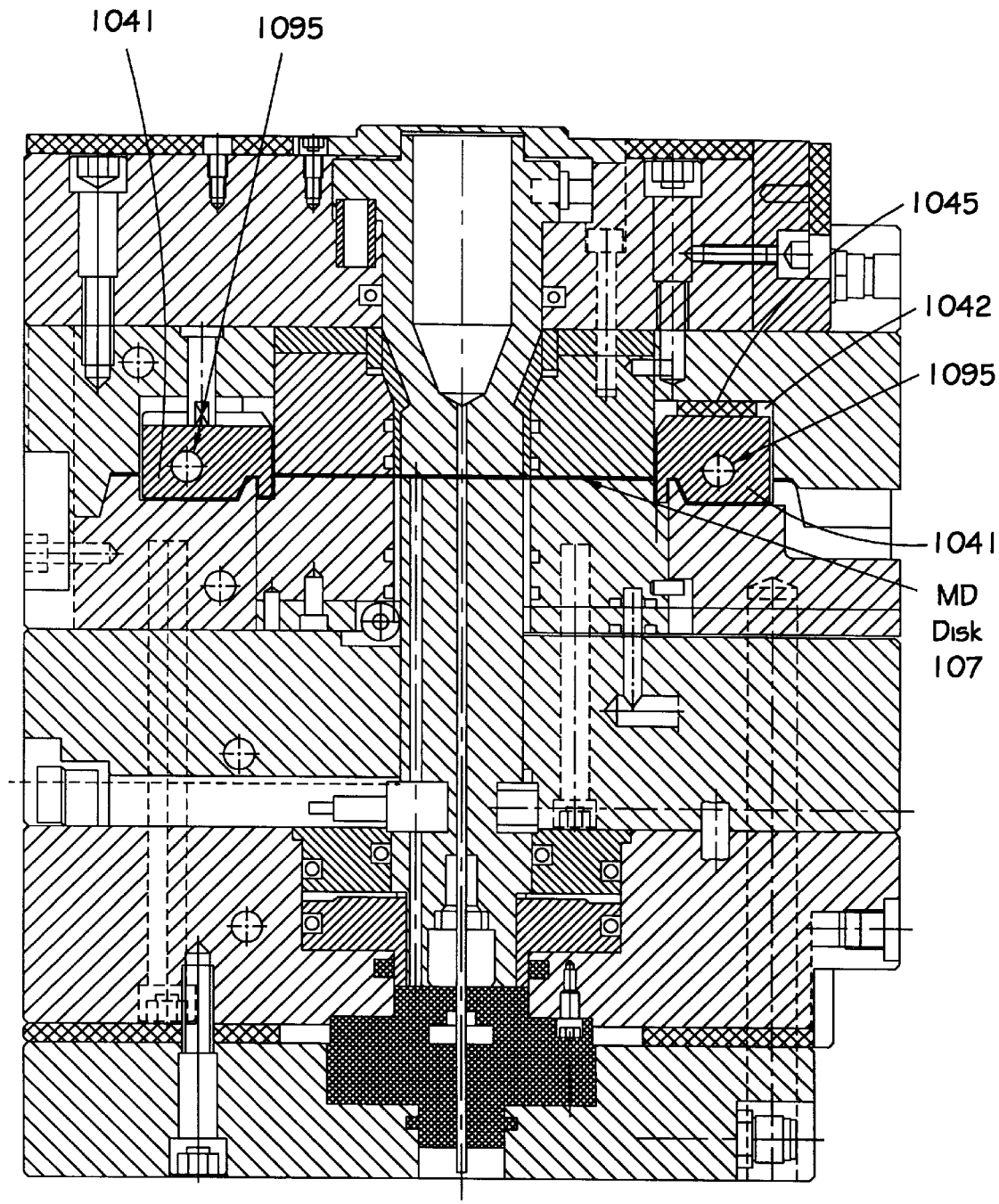
FIGS. 10e–f illustrate the preferred embodiment of a mold of the present invention.
Figure 10F:
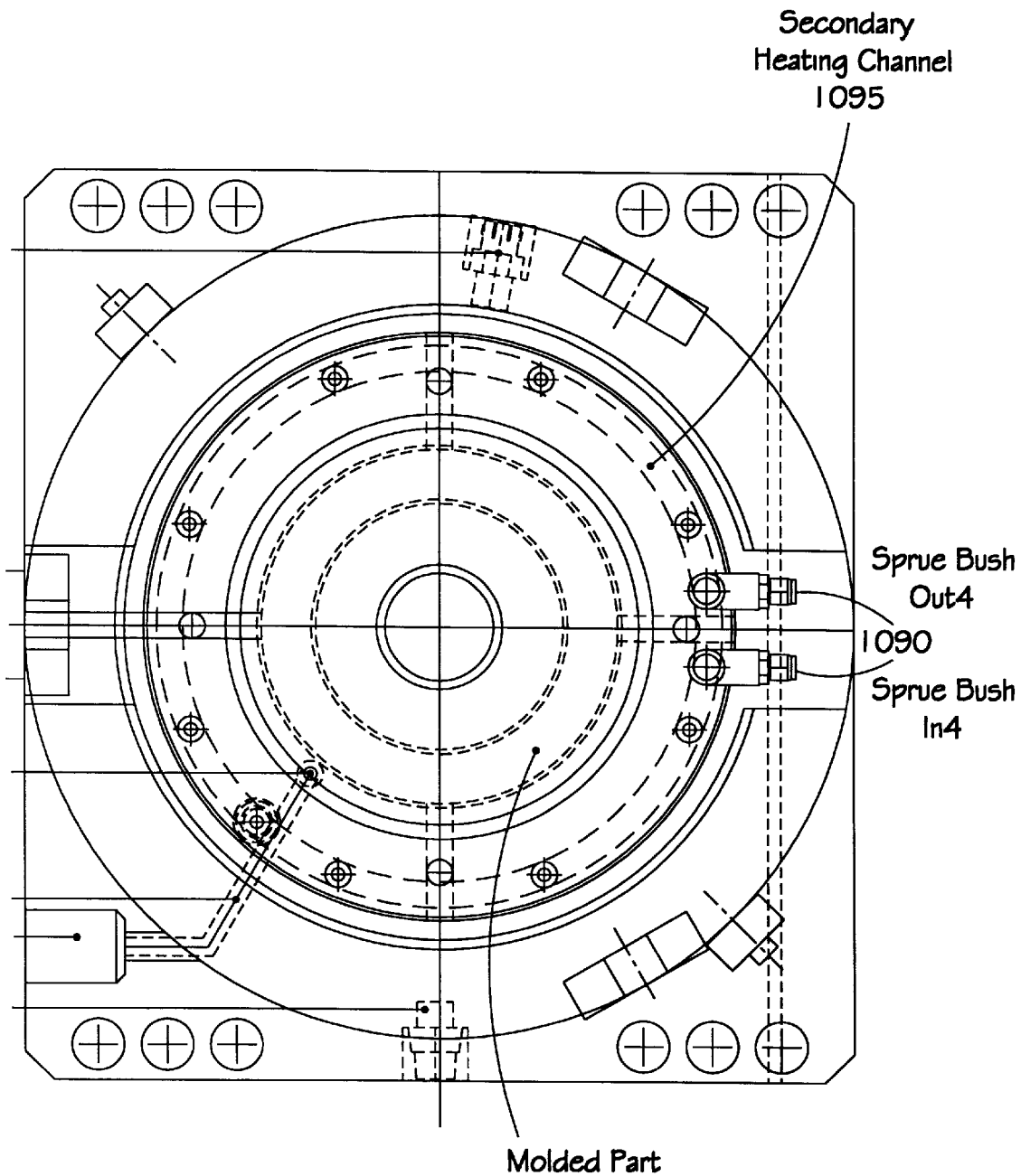

Referring now to FIGS. 10*e* and 10*f*, a preferred embodiment of the present invention is illustrated. The present invention identifies a number of approaches that permit utilization of the outer radial surface area previously not available for use in prior art MO disks due to the ski jump formation, increasing the storage capacity and accessibility to magneto-optical information over that available with prior art MO disks. In the preferred embodiment, the present invention utilizes a mold 1083 that is similar to that of FIG. 10*d* in that the mold includes primary liquid heating means well known in the art, including: a liquid such as oil or water and associated channel(s) for transport of the liquid (not shown); however, the mold 1083 differs over that of the prior art in that it utilizes a secondary liquid heating means 1090 (FIG. 10*f*). The secondary heating means includes a modified outer ring portion 1041 (FIG. 10*e*). The outer ring portion 1041 comprises a second independent liquid flow path and hookups that allow for a secondary heating channel 1095. The secondary heating channel 1095 is located to allow for selective heating of local areas of the mold 1083. Those skilled in the art will recognize that placement of the secondary channel 1095 within the outer ring portion 1041 may vary depending on the materials used for making the mold 1083 and MO disk 107, but preferably will be disposed in the vicinity of the outer diameter of the cavity for holding the materials for molding MO disk 107. To the end of achieving selective and differential heating from that of the remainder of the mold 1083, in the present invention the outer ring portion 1041 is thermally separated by an air gap 1042 and thermal attachment spacer portion 1045. In contrast, in the prior art thermal spacing between the outer ring 1022 (FIG. 10*d*) and the remainder of the mold 1078 is not contemplated or utilized since differential heating is not utilized. In the preferred embodiment, the primary liquid heating means raise the temperature of the mold 1083 to a temperature of approximately 115 degrees C. and the secondary heating channel 1095 heats the outer ring portion 1041 to a temperature of approximately 195 degrees C. Accordingly, in the present invention, material is injected into the mold 1083 such that an inner portion of the molded MO disk 107 is heated to a different temperature than an outer portion, resulting in a MO disk 107 that does not vary in height appreciably across the entire surface of the disk. This secondary heating means 1090 is provided to allow for improved flow into the outer radius areas, which will give a more uniform part density, and therefore reduce differential shrinkage. Shrinkage that is uniform along the MO disk 107 surface will result in a reduced ski jump and thus permit improved access by the flying MO head 106 to the outer radius of the MO disk.

Although heating with liquid for both the primary and secondary heating means is discussed above, in alternative embodiments electrically heated elements could be placed into annular groves or recesses in the mold to accomplish the same effect. While one combination of temperatures have been described with reference to the preferred embodiment, it is understood that other temperature combinations are possible and may be needed, for example, because of differing geometries, heat capacities, etc. of the mold and associated components.

Figure 10H:
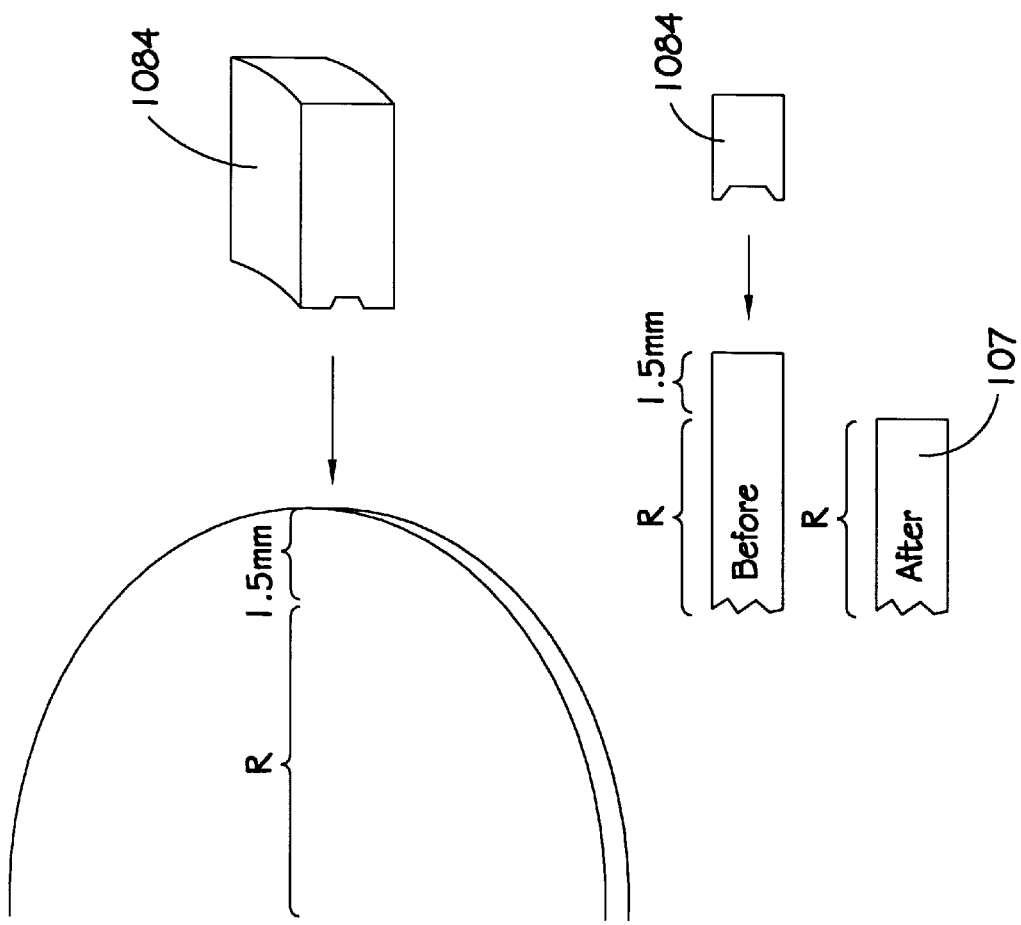
FIG. 10h illustrates the use of a trim tool in an alternative embodiment of the present invention.
Figure 101:
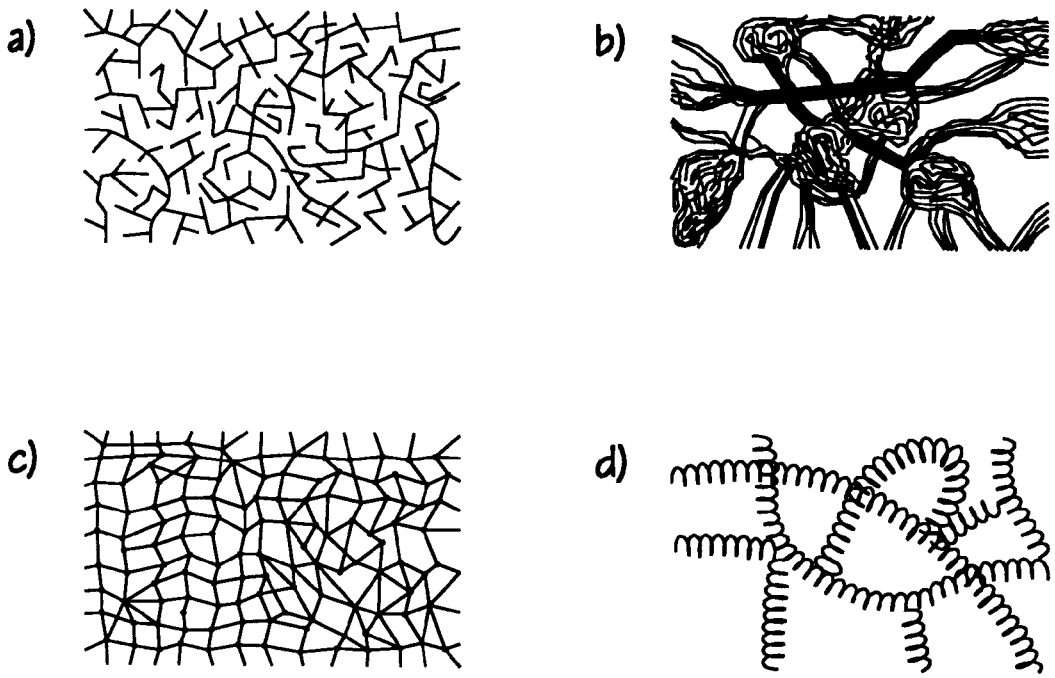

In a second embodiment of the present invention illustrated in FIG. 10g, the radius "R" of the prior mold is modified to include a circular cavity in a first half 1081 and a second half 1082, the cavities comprises a radius that is increased in an exemplary embodiment by approximately 1.5–2.0 mm over that of the prior art radius "R" (i.e., R+(1.5–2.0) mm) such that the onset of the ski jump will occur at a larger radial distance from the center of the resulting larger MO disk than the prior art MO disks. Referring now to FIG. 10h, a trim tool 1084 is used in conjunction with a MO disk 107 that was made from the mold of FIG. 10g. The trim tool 1084 may be used to trim the outer radial region of the resulting R+1.5–2.0 mm molded MO disk. The R+1.5–2.0 mm molded MO disk 107 may held between two plates and may be rotated at high speeds. Typically, top and bottom surfaces of the R+1.5–2.0 mm MO disk may be protected from contamination generated from the trimming process by securing a clamp over the top and bottom surfaces. The only exposed areas are preferably those areas that are to be trimmed. As the R+1.5–2.0 mm molded MO disk 107 is rotated, the trim tool 1084 is preferably moved toward the outer edge of the MO disk 107 and maintained in contact until the outer edge of the MO disk 107 is trimmed to a radius "R". At the radius "R", those skilled in the art will recognize that the outer region of the resulting MO disk 107 will be sans the ski jump. In this manner, the resulting MO disk 107 of the present invention is the same diameter as the prior art MO disks but does not exhibit the ski jump of the prior art. A bevel shape or radius may be formed at the outer edge so as to be easier to handle during the drive build as they are easier to pick up and handle. It is understood that in other embodiments of the present invention the cavities may comprise radii other than those discussed above in FIG. 10g and should be limited only by the scope of the ensuing claims.

Figure 10J:
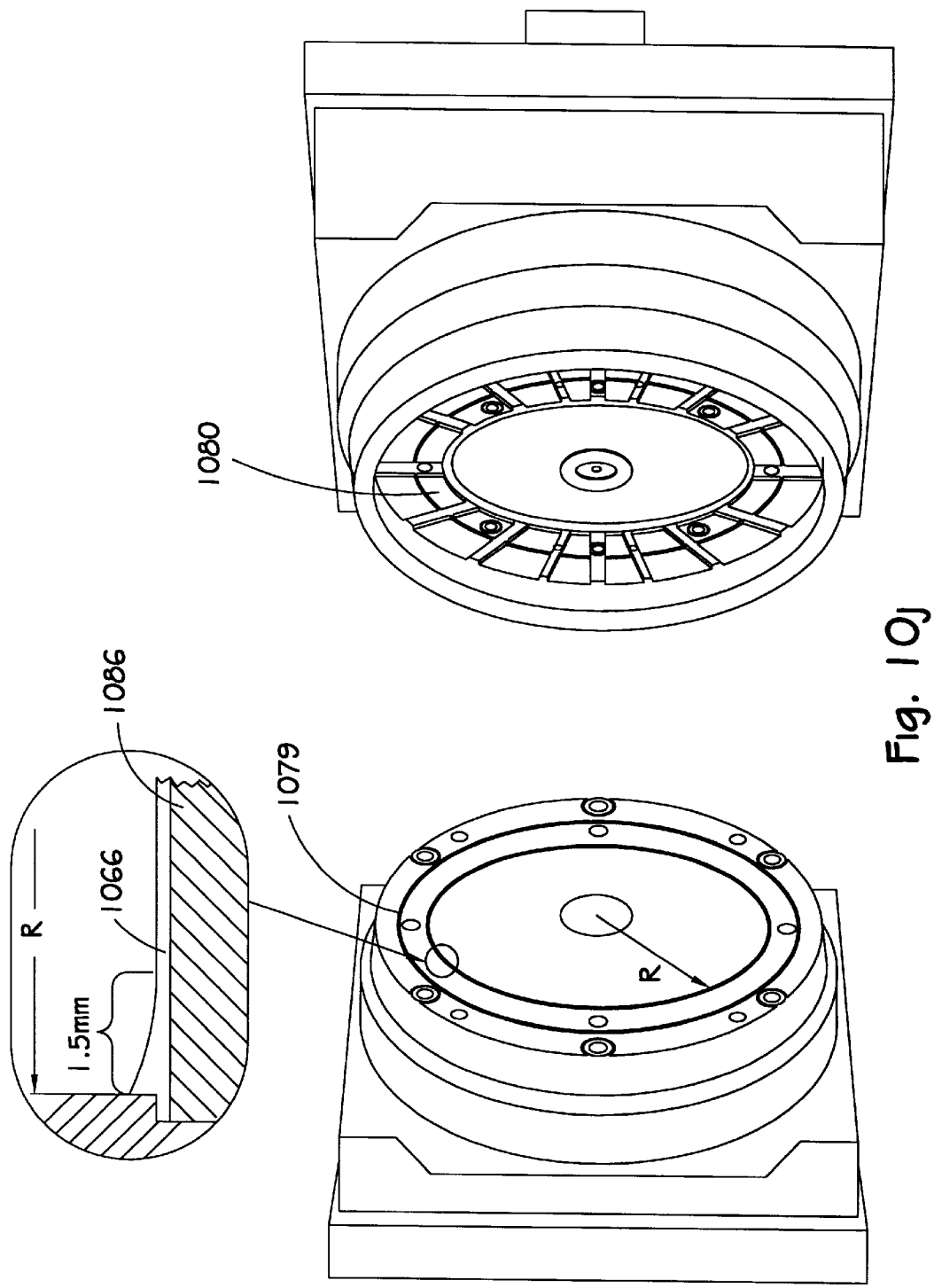
FIG. 10j illustrates a modified stamper in an alternative embodiment of the present invention.

In a third embodiment of the present invention, alternative materials (discussed below) are used with an otherwise conventional injection molding apparatus and process such that the ski jump is not formed. The shrinkage differential, which causes the ski jump to form, is a function of the material to be molded, the conditions for molding set on the injection molding machine, the mold gate and runner design, the mold temperature, the cavity shape, and the amount of plastic injected into the mold. Setting injection molding machine parameters for optimal performance in cycle times may not always provide a part with minimal shrinkage and a properly designed mold may still have some shrinkage primarily as a result of the part's shape. To further reduce shrinkage and maintain the desired machine cycle times, alternate materials can be selected with reduced shrinkage characteristics. In the conventional injection molding process of prior art MO disks, amorphous thermoplastic materials such as polycarbonates are used. These thermoplastic materials are characterized by irregular chain molecules that harden into an entangled and disorderly manner (see FIGS. 10j–b). These materials have a wide temperature range from which they undergo phase changes from a solid to a liquid. Because of the variation in phase change temperatures, a variation in shrinkage occurs within the prior art MO disk during the cooling process, resulting in the ski jump. The shrinkage differential that exists between the inner radial region of the prior art disk and the remaining region of the prior art disk causes the ski jump formation.

In the third embodiment of the present invention it is identified that partially or highly crystallized thermoplastics, such as polyurethane, epoxy, and the like, also known as thermoset plastics (see FIGS. 10j–c) are alternative materials which, when used in the otherwise conventional injection molding process, will show less of a shrinkage differential than conventional materials such as polycarbonate. In addition, alternative molding techniques such as reaction injection molding or press/thermal molding can be used for thermoset and thermoplastic materials respectively. In an exemplary embodiment, a partially crystallized thermoplastic is used such as, but not limited to, polyphenyline sulfide ("PPS"). The thermal characteristics of PPS are very different from those of the polycarbonates. Crystalline materials such as PPS have a very definite freezing and melting point. A hot liquid form of PPS freezes quickly and uniformly so that the PPS liquid is frozen into a shape of the conventional cavity. In this manner, a ski jump is preferably not formed when PPS is used in the otherwise conventional injection molding process of FIG. 10d. In other embodiments, because the crystalline materials may require high temperatures to process, the mold dimensions and configurations may require alteration. The higher the temperature used, the greater is the shrinkage rate of materials, accordingly, a larger sized mold cavity may be needed when using materials with higher melting temperatures than polycarbonate.

Referring briefly back to FIG. 10d, the prior art stamper 1085 typically comprises a thin flat circular sheet of nickel and typically contains information (i.e., servo patterns, etc.,) that is impressed into the prior art molded MO disk during the injection molding process. In the prior art, the stamper 1085 (FIG. 10d) is flat across a cross-section of its surface, including the outer 1.5–2.0 mm used for molding and where the ski jump 1066 is typically formed. The present invention identifies that the ski jump 1088 will preferably be reduced or eliminated when the prior art mold comprising a radius "R" is used in conjunction with a modified stamper 1066 (FIG. 10j) of a fourth embodiment of the present invention. In the fourth embodiment, the stamper 1066 is formed at an outer edge portion in the shape of a reverse ski jump. For example, for a given prior art MO disk, if an anticipated prior art ski jump height is 15 microns at the outer edge, a stamper with a nominal 300 microns thickness throughout, may be increased to approximately 315 microns in thickness at its outer edge and decrease radially inward according to the profile of the anticipated ski jump. The resulting stamper shape should preferably correlate to an increase or decrease in height of the profile of the ski jump formed when using the prior art stamper 1085. Because shape of the modified stamper 1066 results in a thinner MO disk at the outer radial region than the inner region, the differential between shrinkage between the outer and inner regions is reduced resulting in little or no ski jump in the outer region. The ski jump is typically formed on both the top and bottom surfaces of the prior art MO disks, thus, the modified stamper 1066 of the present invention, if present on both sides of the conventional mold cavity, may alter the profile of the ski jump on both sides.

The aforementioned embodiments of the present invention have been shown to eliminate completely or reduce the onset of the ski jump from the outer circumference of the MO disk 107 to less than 0.5 mm from the circumference and to reduce the ski jump height to less than 3 um. Those skilled in the art will recognize that reduction or elimination of the ski jump makes available for reading and writing of information data tracks that previously in the prior art were unavailable within the region of the prior art ski jump because of the inability to maintain a stable flying condition of a flying head over prior art MO disks. The aforementioned embodiment for elimination of the ski jump, coupled with a flying MO head 106 described below, makes accessible these previously data tracks at the outer radius of the MO disk 107 that were previously unavailable with the prior art.

FIG. 11 is a diagram of a magneto-optical head used over a surface of a magneto-optical disk. In an exemplary embodiment, the excursion of the optical spot formed by the GRIN lens objective optics 446 over the recording/storage layer 349 of the MO disk 107 is limited at an outer radius by a requirement that the flying MO head 106 maintain a stable aerodynamic flying height and, at an inner radius by mechanical constraints of the magneto-optical (MO) data storage and retrieval system 100 that limit movement of the actuator arm 105. Accordingly, in the exemplary embodiment, the objective optics 446 may access a maximum usable area of the MO disk 107 that comprises a minimum inner radius $r_i$ that is 26.093 mm and a maximum outer radius $r_o$ that is 63.680 mm. In a preferred embodiment, the MO disk 107 comprises 1406.5 data tracks/mm (e.g., a track pitch of 0.711 um), and the flying MO head 106 is oriented over the MO disk 107 at the maximal inner excursion with a skew angle of −13.53 degrees and at the maximal outer excursion with a skew angle of 17.72 degrees (relative to tangential lines drawn at the radial data tracks located at the intersection point of the optical spot formed by the objective optics 446 and the minimum inner and maximum outer radii of the recording/storage layer 349, respectively). In the preferred embodiment, the areal density over all the MO disk 107 radii is maximized using "zone recording" techniques to achieve an exemplary local area density of approximately 3.6 Gb per square inch. A maximum user data rate at the outer radius of the MO disk 107 comprises at least 120 Mbits/sec (at a rotation rate of approximately 4500 RPM). Those skilled in the art will recognize that the user data rate $R_D$ may be calculated using the relationship $R_D=(v)\times(D_L)$ (where v=disk velocity and $D_L$=linear bit density of the MO disk 107). The disk velocity $v_o$ at the outer radius of the MO disk 107 may be calculated using the relationship $v_o=r_o\omega=(63.680 \text{ mm})\times(2\pi \text{ rad/rev})\times(4500 \text{ rev}/60 \text{ sec})=30.008$ m/s. Accordingly, the linear bit density $D_L$ required to sustain the desired maximum user data rate at the outer radius may be calculated using the relationship $D_L=R_D/v_o=(120 \text{ Mbits/sec})/(30.008 \text{ m/s})=3998.9$ bits/mm.

Figure 12:
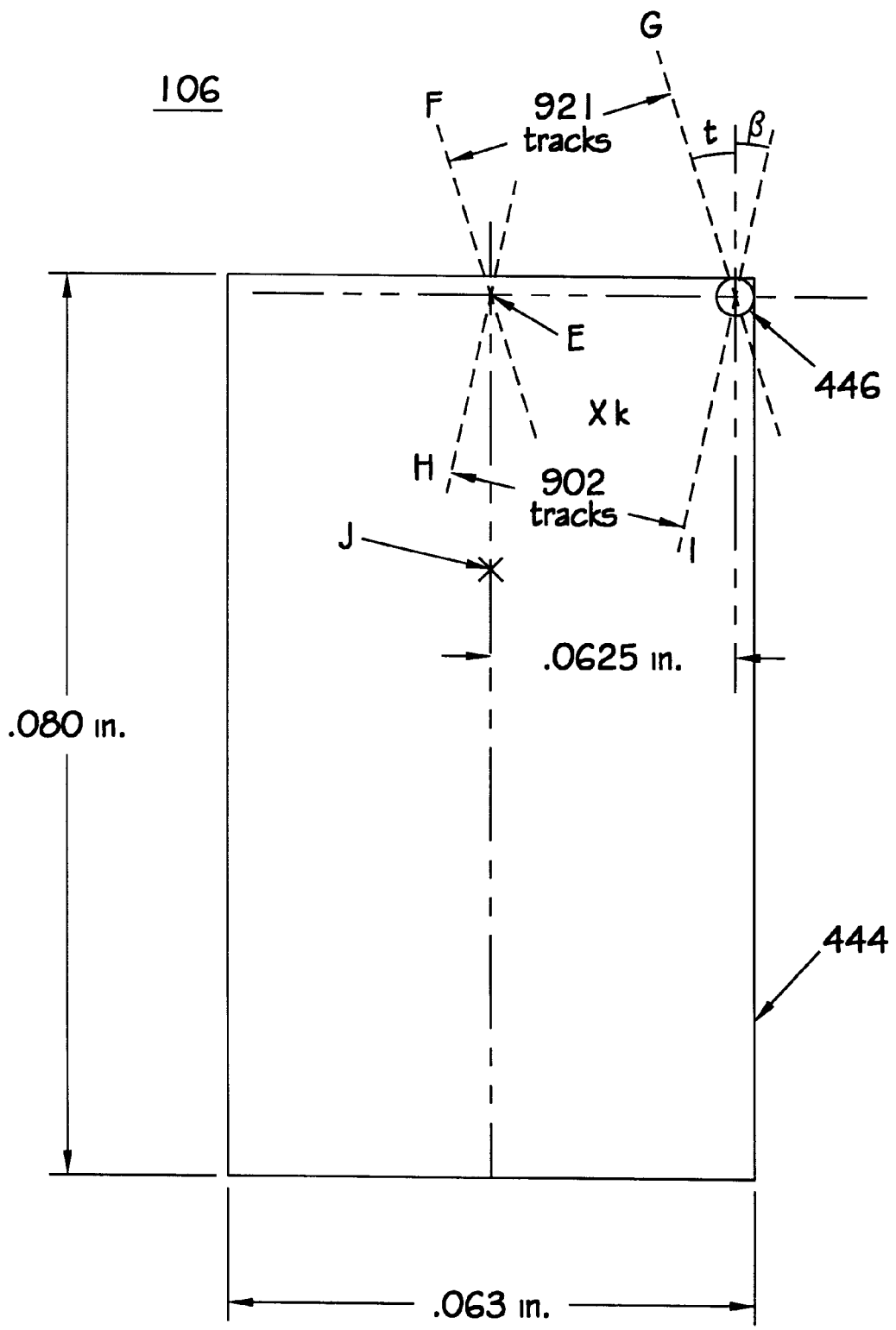
FIG. 12 is a diagram illustrating the data tracks that are gained and lost by positioning an objective optics and a magnetic coil at a corner of the magneto-optical head.

FIG. 12 is a diagram illustrating the data tracks that are gained and lost by positioning the objective optics and magnetic coil at a corner of the magneto-optical head. Those skilled in the art will recognize that use of objective optics along a central axis and inward from a periphery of a flying MO head results in data tracks at the outer radius of a respective MO disk that may not be accessed. In the present invention, because the GRIN lens objective optics 446 and the elongated magnetic coil 460 are located towards or at a periphery of the flying MO head 106 (as compared to locating the objective optics 446 inward from the periphery and along a central axis of the flying MO head 106), the radial data tracks that may be accessed at the outer excursion of the magneto-optical head 106 is offset by approximately an equal number of radial data tracks that are inaccessible at the inner excursion of the flying MO head 106. The present invention takes advantage of the increased recording capacity of the data tracks at the outer radii, as compared to the recording capacity of the data tracks at the inner radii. As compared to the prior art, by positioning the objective optics 446 and elongated magnetic coil 460 offset from the central axis, the present invention increases the amount of data that may be written and read using the MO disk 107.

The increase in data that may be accessed from the recording/storage layer 349 of the MO disk 107 may be illustrated by comparing a position of the objective optics 446 and the elongated magnetic coil 460 at a corner of the flying MO head 106 to an objective optics and a magnetic coil positioned along a central axis. In FIG. 12, the comparison is illustrated by a perpendicular distance between a tangential line drawn at a radial data track located at the optical spot formed by the objective optics 446 and a tangential line drawn at a radial data track located under point E. In an exemplary embodiment, the objective optics 446 and the elongated magnetic coil 460 are placed 0.0265 inches off-center from the central axis at a corner of the flying MO head 106. In the exemplary embodiment, at the maximal outer excursion of the flying MO head 106, the perpendicular distance between the tangential lines (F and G) may be calculated as $d_o=(0.0265 \text{ in})\times(\cos 17.72 \text{ degrees})=0.02525$ in=641.165 um and at the maximum inner excursion between the tangential lines (H and I) as $d_i=(0.0265 \text{ in.})\times(\cos 13.53 \text{ degrees})=0.025765$ in=654.42 um. Accordingly, compared to point E, the placement of the objective optics 446 and elongated magnetic coil 460 at a corner of the flying MO head 106 results in a gain of approximately 902 data tracks at the maximal outer excursion of the flying MO head 106 (e.g., 641.165 um/0.711 um/track), and a loss of approximately 921 tracks at the maximal inner excursion of the flying MO head 106 (e.g., 654.42 um/0.711 um/track). In the exemplary embodiment, the data gained with the maximal outer excursion of the flying MO head 106 may be calculated using the relationship $C_o=(902 \text{ tracks})\times(D_L)\times(2\pi)\times(r_o')$, where $r_o'$ is a mean radius of the recording tracks gained (calculated as $r_o-(0.5)\times(641.165 \text{ um})=63.3594$ mm), and the data lost with the maximal inner excursion of the MO head 106 may be calculated from the relationship $C_i=(921 \text{ tracks})\times(D_L)\times(2\pi)\times(r_i')$, where $r_i'$ is a mean radius of the recording tracks lost (calculated as $r_i-(0.5)\times(654.42 \text{ um})=26.4202$ mm). Accordingly, $C_o=1.43595$ Gb=179.493 MB, and $C_i=0.061139$ Gb (GigaBytes)=76.423 MB (MegaBytes). Compared to objective optics positioned at point E on the magneto-optical head 106, the exemplary embodiment provides a net gain of 103.070 MegaBytes that may be read and written from the MO disk 107. Thus, compared to prior art objective optics located along a central axis and inward from the periphery of an MO head (e.g., point F), placement of the objective optics 446 and the elongated magnetic coil 460 at the periphery of the flying MO head 106 provides an increase in the amount of data that may be read and written by the magneto-optical (MO) data storage and retrieval system 100. Although, the objective optics 446 has been described as being located along a periphery of the flying MO head 106, in other embodiment, other positions of the objective optics 446 and elongated magnetic coil 460 may also provide improved data access.

Figure 13:
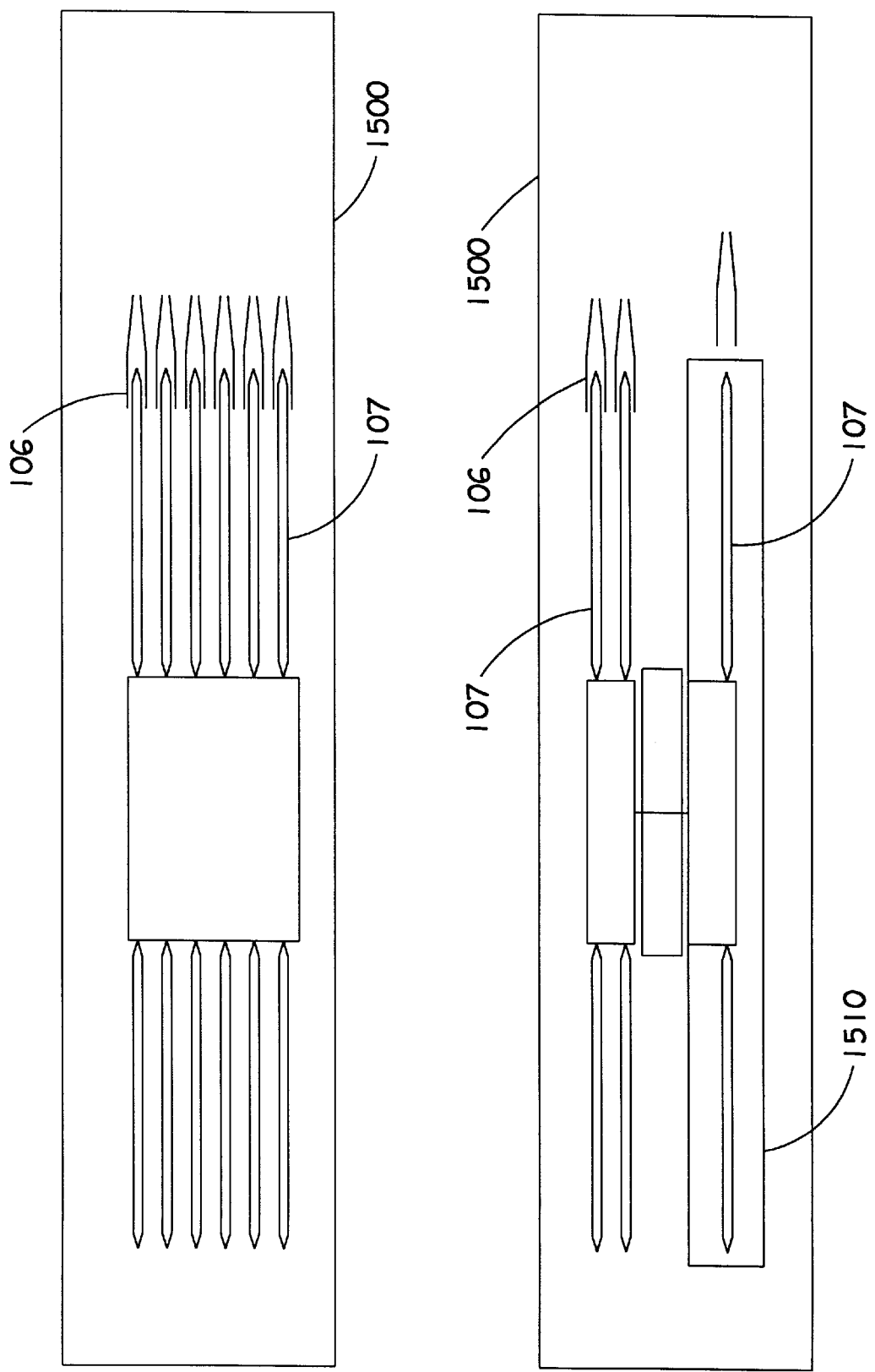
FIG. 13 is a diagram illustrating two embodiments of a magneto-optical disk drive of the present invention.

FIG. 13 is a diagram illustrating a magneto-optical disk drive. In a preferred embodiment, the magneto-optical system 100 comprises a compact high-speed and high-capacity MO disk drive 1500 that includes an industry standard 5.25 inch half-height form factor (1.625 inch), at least six double-sided MO disks 107, and at least twelve flying MO heads 106. As discussed above, the flying MO heads 106 may be manufactured to include optical and magnetic elements that provide a very small mass and low profile high NA optical system so as to enable utilization of at least one double-sided MO disk 107 and preferably a plurality of double-sided MO disks 107 within a small form factor disk drive and; therefore, to comprise a higher areal and volumetric and storage capacity than is permitted in an equivalent volume of the prior art. In the preferred embodiment, a spacing between each of the at least six MO disks 107 is 0.182 inches. In an exemplary embodiment, the elongated magnetic coil 460 and yoke 462 enable each side of the MO disk 107 to comprise at least 5 Gigabytes of written data marks. In an exemplary embodiment. the objective optics 446 provides an approximately 0.54 um optical spot size 448 to enable reading of the data marks The present invention should not, however, be limited by these specifications as it is understood that in alternative embodiments other spacings between the set of MO disks 107 are possible to achieve other volumetric storage capacities; and with other optical spots sizes and coil and yoke designs, other MO disk 107 areal data capacities.

In an alternative embodiment, the half-height form factor MO disk drive 1500 may include a removable MO disk cartridge portion 1510 and two fixed internal MO disks 107. By providing the removable MO disk cartridge portion 1510, the fixed internal and removable combination permits external information to be efficiently delivered to the MO disk drive 1500 for subsequent transfer to the internal MO disks 107. The copied information may, subsequently, be recorded back onto the removable MO disk cartridge portion 1510 for distribution to other computer systems. In addition, the removable MO disk cartridge portion 1510 allows for very convenient and high speed back-up storage of the internal MO spinning disks 107. The fixed internal and removable combination also permits storage of data files on the removable MO disk cartridge portion 1510 and system files and software applications on the internal MO spinning disks 107. In another alternative embodiment (not shown) an MO disk drive 1500 may include: any number (including zero) of internal MO disks 107 and/or any number of MO disks 107 within any number of removable MO disk cartridge portions 1510.

Although the present invention for providing increased storage capacity has been described in a magneto-optical storage environment, those skilled in the art will recognize that features of the present invention are applicable to other storage environments including: magnetic, optical, and DVD and, therefore, because the present invention has been described herein with reference to particular embodiments thereof, a latitude of modification, various changes and substitutions are intended in the foregoing disclosure, which should be limited only by the scope of the claims.

What is claimed is a:

1. A storage disk comprising:
   a center;
   an outer edge disposed radially about said center;
   a datum;
   a surface disposed between said center and said outer edge; wherein over said surface said surface varies in a height relative to said datum by an insubstantial amount, and
   wherein said height relative to said datum varies by less than 8 um over said surface.

2. An information storage system comprising:
   a rotating storage media, said media comprising:
      a center;
      an outer edge disposed radially about said center;
      a datum; and
      a surface disposed between said center and said outer edge; wherein said surface varies in height by an insubstantial amount relative to said datum, and wherein said height relative to said datum varies by less than 8 um over said surface.

3. An information storage system comprising:
   a rotating storage media, said media comprising:
      a center;
      an outer edge disposed radially about said center;
      a datum;
      a surface disposed between said center and said outer edge; wherein said surface varies in height by an insubstantial amount relative to said datum; and
      at least one head for accessing information at said surface, wherein said head accesses said information at said surface at a point that is less than or equal to 1.5 mm from said outer edge.

* * * * *